(12) United States Patent
Iwasaki

(10) Patent No.: US 12,328,258 B2
(45) Date of Patent: *Jun. 10, 2025

(54) SMALL FORM FACTOR PLUGGABLE UNIT WITH WIRELESS CAPABILITIES AND METHODS, SYSTEMS AND DEVICES UTILIZING SAME

(71) Applicant: Sean Iwasaki, Chicago, IL (US)

(72) Inventor: Sean Iwasaki, Chicago, IL (US)

( * ) Notice: Subject to any disclaimer, the term of this patent is extended or adjusted under 35 U.S.C. 154(b) by 400 days.

This patent is subject to a terminal disclaimer.

(21) Appl. No.: 17/862,260

(22) Filed: Jul. 11, 2022

(65) Prior Publication Data

US 2023/0006926 A1 Jan. 5, 2023

Related U.S. Application Data

(63) Continuation-in-part of application No. 17/705,879, filed on Mar. 28, 2022, and a continuation-in-part of application No. 17/232,600, filed on Apr. 16, 2021, now Pat. No. 11,388,091, which is a continuation-in-part of application No. 16/917,475, filed on Jun. 30, 2020, now Pat. No. 11,444,870, said application No. 17/705,879 is a continuation-in-part of application No. 16/839,334, filed on Apr. 3, 2020, now Pat. No. 11,290,203, said application No. 16/917,475 is a continuation-in-part of application No. 16/839,260, filed on Apr. 3, 2020, now Pat. No. 11,431,625, and a continuation-in-part of application No. 16/415,899, filed on May 17, 2019, now Pat. No. 10,985,440, said application No. 16/839,260 is a continuation of application No. 15/687,862, filed on Aug. 28, 2017, now Pat. No. 10,637,776, said application No. 16/839,334 is a continuation-in-part (Continued)

(51) Int. Cl.
*H04L 45/60* (2022.01)
*H04L 49/00* (2022.01)
*H04L 49/109* (2022.01)
*H04L 49/35* (2022.01)
*H04W 40/00* (2009.01)

(52) U.S. Cl.
CPC ............ *H04L 45/60* (2013.01); *H04L 49/109* (2013.01); *H04L 49/30* (2013.01); *H04L 49/355* (2013.01)

(58) Field of Classification Search
CPC ....... H04L 45/60; H04L 49/109; H04L 49/30; H04L 49/355; H04W 40/00
See application file for complete search history.

(56) References Cited

U.S. PATENT DOCUMENTS

2010/0115316 A1\* 5/2010 Diab ............... G06F 1/3234
713/323
2012/0041572 A1\* 2/2012 Halsall ............ H04L 12/40032
700/19

(Continued)

*Primary Examiner* — Harry H Kim
(74) *Attorney, Agent, or Firm* — Charles T. Riggs, Jr.

(57) ABSTRACT

The present subject matter relates to one or more devices, systems and/or methods for providing wireless telecommunication services. A Small Form Factor Pluggable Unit (SFP) incorporates wireless capabilities, and includes an integrated or an external antenna. The SFP comprises wireless circuitry for transmitting and receive multiple and distinct wireless signals, including Wi-Fi and Bluetooth for communicating with various equipment, devices and/or networks.

22 Claims, 31 Drawing Sheets

Related U.S. Application Data of application No. 15/687,862, filed on Aug. 28, 2017, now Pat. No. 10,637,776, said application No. 16/415,899 is a continuation of application No. 15/294,858, filed on Oct. 17, 2016, now Pat. No. 10,446,909.

(60) Provisional application No. 62/381,168, filed on Aug. 30, 2016, provisional application No. 62/243,957, filed on Oct. 20, 2015.

(56) References Cited

U.S. PATENT DOCUMENTS

| | | | | |
|---|---|---|---|---|
| 2013/0272348 A1* | 10/2013 | Lai | ............... | H04B 3/00 375/219 |
| 2014/0085141 A1* | 3/2014 | Geva | ............... | H04J 3/0644 368/46 |

* cited by examiner

| COLOR | CADENCE | DESCRIPTION |
|---|---|---|
| GREEN | STEADY | WI-FI "LINKED" & BLUETOOTH "IDLE" |
| GREEN | BLINKING | WI-FI "ACTIVITY" & BLUETOOTH "IDLE" |
| BLUE | STEADY | WI-FI "IDLE" & BLUETOOTH "LINKED" |
| BLUE | BLINKING | WI-FI "IDLE" & BLUETOOTH "ACTIVITY" |
| GREEN BLUE | ALT BLINK 1 SEC | WI-FI & BLUETOOTH "LINKED" |
| AMBER | STEADY | SFP STATUS: "ON" & "WIRELESS DISABLED" |
| AMBER | BLINKING | SFP STATUS: "ON" & "TEST/UPGRADING" |
| NONE | NONE | SFP STATUS: "NO POWER - NOT WORKING" |

FIGURE 14

| WSFP VARIANT | SPEED | LANES | MOD | WSFP DEVICE VARIANT COMPATIBILITY PORT (CAGE – CONNECTOR) |
|---|---|---|---|---|
| SFP | 4Gb/s | 1 x 4G/s | NRZ | SFP |
| SFP+ | 10Gb/s | 1 x 10Gb/s | NRZ | SFP, SFP+ |
| SFP28 | 25Gb/s | 1 x 25Gb/s | NRZ | SFP, SFP+, SFP28 |
| SFP56 | 50Gb/s | 1 x 50Gb/s | PAM | SFP, SFP+, SFP28, SFP56 |
| SFP112 | 100Gb/s | 1 x 100Gb/s | PAM4 | SFP, SFP+, SFP28, SFP56, SFP112, SFP-DD |
| SFP-DD | 100Gb/s | 2 x 50Gb/s | PAM4 | SFP, SFP+, SFP28, SFP56, SFP112, SFP-DD |
| SFP-DD112 | 200Gb/s | 2 x 100Gb/s | PAM4 | SFP, SFP+, SFP28, SFP56, SFP112, SFP-DD |
| QSFP | 16Gb/s | 4 x 4Gb/s | NRZ | QSFP |
| QSFP+ | 40Gb/s | 4 x 10Gb/s | NRZ | QSFP, QSFP+ |
| QSFP28 | 100Gb/s | 4 x 25Gb/s | NRZ | QSFP, QSFP+, QSFP28 |
| QSFP56 | 200Gb/s | 4 x 50Gb/s | PAM4 | QSFP, QSFP+, QSFP28, QSFP56 |
| QSFP112 | 400Gb/s | 4 x 100Gb/s | PAM4 | QSFP, QSFP+, QSFP28, QSFP112, QSFP-DD |
| QSFP-DD | 200Gb/s | 8 x 25Gb/s | NRZ | QSFP, QSFP+, QSFP28, QSFP112, QSFP-DD |
| QSFP-DD | 400Gb/s | 8 x 50Gb/s | PAM4 | QSFP, QSFP+, QSFP28, QSFP112, QSFP-DD |
| QSFP-DD800 | 800Gb/s | 8 x 100Gb/s | PAM4 | QSFP, QSFP+, QSFP28, QSFP112, QSFP-DD, QSFP-DD800 |
| OSFP | 400Gb/s | 8 x 50Gb/s | PAM4 | OSFP |
| OSFP-800 | 800Gb/s | 8 x 100Gb/s | PAM4 | OSFP, OSFP-800 |
| OSFP-XD | 1600Gb/s | 16 x 100Gb/s | PAM4 | OSFP, OSFP-800, OSFP-XD |

FIGURE 36

SMALL FORM FACTOR PLUGGABLE UNIT WITH WIRELESS CAPABILITIES AND METHODS, SYSTEMS AND DEVICES UTILIZING SAME

RELATED APPLICATIONS

This application is a continuation-in-part of copending U.S. application Ser. No. 17/232,600, which is a continuation-in-part of U.S. application Ser. No. 16/917,475 entitled Circuitry for Demarcation Devices and Methods Utilizing Same, file Jun. 30, 2020, which is a continuation-in-part of:

copending U.S. application Ser. No. 16/839,260 entitled Multi-functional Circuitry for Communications Networks and Methods and Devices Utilizing Same, filed Apr. 3, 2020, which is a continuation of U.S. application Ser. No. 15/687,862 entitled Multi-functional Circuity for Communications Networks and Methods and Devices Utilizing Same, filed Aug. 28, 2017, now U.S. Pat. No. 10,637,776 issued Apr. 28, 2020, and which claims priority to U.S. Provisional Application Ser. No. 62/381,168 filed Aug. 30, 2016; and copending U.S. application Ser. No. 16/415,899 entitled Small Form Factor Pluggable Unit with Wireless Capabilities, filed May 17, 2019, which is a continuation of U.S. application Ser. No. 15/294,858 entitled Small Form Factor Pluggable Unit with Wireless Capabilities, filed Oct. 17, 2016, now U.S. Pat. No. 10,446,909 issued on Oct. 15, 2019, and which claims priority to Provisional Application Ser. No. 62/243,957 filed Oct. 20, 2015; and copending U.S. application Ser. No. 17/705,879 entitled Circuitry for Remote Optical Communications Devices and Methods Utilizing Same, filed Mar. 28, 2022, which is a continuation in part of U.S. application Ser. No. 16/839,334 entitled Circuitry for Remote Optical Communications Devices and Methods Utilizing Same, filed Apr. 3, 2020, now U.S. Pat. No. 11,290,203, which is a continuation-in-part of U.S. application Ser. No. 15/687,862 entitled Multi-functional Circuity for Communications Networks and Methods and Devices Utilizing Same, filed Aug. 28, 2017, now U.S. Pat. No. 10,637,776, the entire disclosures of which are herein incorporated by reference.

TECHNICAL FIELD

The exemplary teachings herein pertain to telecommunications equipment, methods and systems. Specifically, the present disclosure relates to methods and systems incorporating Small Form-factor Pluggable (SFP) devices used to provide communication services for the communication market.

BACKGROUND

Small form factor pluggable units such as disclosed in U.S. Pat. No. 8,761,604 issued to Lavoie et al. on Jun. 24, 2014, herein fully incorporated by reference, are known in the art. As described in Column 1, lines 10-48 in the '604 patent:

Small Form-factor Pluggable (SFP) devices are standardized, hot-pluggable devices used to provide communication services for the communication market. The SFF (Small Form Factor) Committee defines the mechanical, electrical, and software specifications of the SFP device to ensure interoperability among SFP devices and chassis. SFF Committee document INF-8074i Rev 1.0 provides specifications for SFP (Small Formfactor Pluggable) Transceiver. SFF Committee documents SFF-8431 Rev 4.1 SFP+ 10 Gb/s and Low Speed Electrical Interface provides specifications for SFP+ devices. SFF Committee document INF-8438i Rev 1.0 provides specifications for QSFP (Quad Small Formfactor Pluggable) Transceiver. SFF Committee document INF-8077i Rev 4.5 (10 Gigabit Small Form Factor Pluggable Module) provides specifications for XFP devices. These documents represent the various families of SFP devices available.

SFP devices are designed to be inserted within a cage, which the cage is attached to the communication equipment circuit assembly. SFF Committee document SFF-8432 Rev 5.1 SFP+ provides specifications for the SFP+ module and cage. Ethernet switches. Ethernet routers, servers are examples of equipment using SFP type devices. SFP devices are available with different exterior connectors for various applications. SFP devices are available with coaxial connectors, SC/LC optical connectors, and RJ modular jack types connectors.

SFF Committee document SFF-8472 Diagnostic Monitoring Interface for Optical Transceivers provides specifications on the SFP device's identity, status, and real-time operating conditions. SFF-8472 describes a register and memory map which provides alarms, warnings, vendor identity, SFP description and type, SFP real time diagnostic, and vendor specific registers. This information is to be used by the SFP host equipment.

Other references relating to and/or discuss technology related to small form factor units or devices include U.S. Pat. No. 8,036,539 issued to Kiely et al. on Oct. 11, 2011 and U.S. Patent Application Publication No. 2006/0209886 issued to Silberman et al. on Sep. 21, 2006. Each of these references is herein fully incorporated by reference.

By way of further background, small form factor pluggable (SFP) devices are used to provide a flexible means of providing communication services for the telecommunication network. The SFP devices are typically deployed on communication network equipment such as an Ethernet access switch, Ethernet router, a broadband fiber multiplexer, or media converters. SFP devices are designed to support optical and wired Ethernet, TDM SONET, Fiber Channel, and other communications standards. Due to its small and portable physical size, SFP devices have expanded in specifications to address other applications. SFP devices presently are defined for XFP, SFP, SFP+, QSFP, QLSFP, QSFP+, and CXP technologies, and other variants discussed herein. SFP devices are standardized among equipment vendors and network operators to support interoperability. Due to the low cost, size, and interoperability, SFP devices are used extensively in all communication service applications.

The SFP+ (or SFP10) devices were later introduced to address higher transmission speeds. SFP devices further evolved to other variants, SFP28, SFP56, SFP-112, SFP-DD, and SFP-DD112 to address much greater speeds, while adhering to the SFP devices mechanical form factor. The SFP devices also evolved into the quad small form-factor pluggable (QSFP) devices, which is larger in mechanical size and capacity than SFP devices. The QSFP devices also had other variants, QSFP+, QSFP28, QSFP56, QSFP-DD, and QSFP-DD800 to address higher speed transmission and SFP variant applications. The octal small format pluggable (OSFP) device is still another variant to the SFP devices.

By way of further background, the SNIA SFF Technology Affiliate (TA) Small Form Factor (SFF) and various other Multi Source Agreement (MSA) Committees defines the mechanical, electrical, and software specifications of the SFP devices, their variants, and associated port connectors (edge connector and cage), and management. INF-8074i, Revision 1.0, May 12, 2001, SFP (Small Form factor Pluggable) Transceiver provide specifications for SFP devices. SFF-8083, Revision 3.1, Sep. 13, 2014, SFP+1×10 Gb/s Pluggable Transceiver Solution (SFP10) provide specifications for the required SFF documents to define and implement the SFP+ (SFP10) and SFP+ variant devices. SFF-8402, Revision 1.1, Sep. 13, 2014, SFP+ 1×28 Gb/s Pluggable Transceiver Solution (SFP28) provides the SFF specifications to define and implement a SFP28 device. SFF-8418, Revision 1.4, Jul. 30, 2015, SFP4+10 Gb/s Electrical Interface provide specifications for SFP+ devices. SFF-8419, Revision 1.3, Jun. 11, 2015, SFP+ Power and Low Speed Interface provide specifications for SFP+ devices. SFF-8431, Revision 4.1, Jul. 6, 2009, SFP+10 Gb/s and Low Speed Electrical Interface provide archived specifications for Small Form Factor Pluggable Plus (SFP+) devices. SFP-DD MSA, SFP-DD/SFP-DD112/SFP112, Revision 5.0, Oct. 1, 2021, provide hardware specifications for SFP112 and SFP Double Density (SFP-DD, SFP-DD112, SFP112) devices and their respective variants. This specification defines the electrical and optical connectors, electrical signals and power supplies, mechanical and thermal requirements of the pluggable SFP112 module. Double Density SFP-DD module, and Double Density SFP-DD112 connector and cage system.

NF-8438i, Revision 1.0, November 2006, QSFP (Quad Small Formfactor Pluggable) Transceiver provide specifications for QSFP devices. SFF-8436, Revision 4.9, Aug. 31, 2018, QSFP+4×10 Gb/s Pluggable Transceiver provide specifications for QSFP+ and QSFP+ variant devices. SFF-8635, Revision 0.6, Jun. 29, 2015, QSFP+4×10 Gb/s Pluggable Transceiver Solution (QSFP10) provide specifications for the required SFF documents to define and implement the QSFP+ (QSFP10) and QSFP+ variant devices. SFF-8661, Revision 2.5, Jun. 22, 2018, QSFP+ 4× Module provide specifications for the mechanical housing for a QSFP+ 4× and QSFP+4× variants devices. SFF-8665, Revision 1.9, Jun. 29, 2015. QSFP+28 Gb/s 4× Pluggable Transceiver Solution (QSFP28) provide specifications for the required SFF documents to define and implement the QSFP28 and QSFP28 variant devices. SFF-8679, Revision 1.8, Oct. 4, 2018, QSFP+ 4× Hardware and Electrical Specification provide specifications for the electrical requirements on QSFP+ (QSFP10), QSFP28, and QSFP+ variant devices.

QSFP-DD MSA, QSFP-DD/QSFP-DD800/QSFP112 Revision 6.2, Mar. 11, 2022 provide hardware specifications for QSFP Double Density (QSFP-DD) and QSFP112 pluggable devices and their variants. This specification defines and characterizes high-speed/density 4 and 8 electrical lanes (4×, 8×) modules, cage and connector system. The QSFP-D) and QSFP112 both supports up to 400 Gb/s in aggregate respectively over 8 lanes of 50 Gb/s and over 4 lanes of 100 Gb/s electrical interfaces. QSFP-DD devices doubles the number of high-speed electrical interfaces or lanes supported. The QSFP-DD800 supports up to 800 Gb/s in aggregate over 8 lanes of 100 Gb/s electrical interface. The QSFP-DD and QSFP-DD800 cage and connector designs with 8 lanes are compatible with the 4 lanes QSFP28 and QSFP112 devices. The QSFP-DD800 cage and connector is backwards compatible to 8 lanes QSFP-DD and 4 lanes QSFP28. The QSFP112 cage and connector is backwards compatible to 8 lanes QSFP-DD and 4 lanes QSFP28, QSFP+ devices and their respective variants. The QSFP-DD800 and QSFP112 supports up to 112 Gb/s (56 GBd) per lane electrical operation based on PAM4 signaling. The QSFP-DD and QSFP-DD800 module edge connector consists of a single paddle card with 38 pads on the top and 38 pads on the bottom of the printed circuit board (PCB) assembly for a total of 76 pads. The pads are defined in such a manner to accommodate insertion of a classic QSFP+/QSFP28/QSFP112 module into a QSFP-DD and QSFP-DD800 receptacles.

OSFP MSA, OSFP Module Specification, Revision 4.1, Aug. 2, 2021 provides specifications for the OSFP device mechanical form factor, cage connector, electrical interface, thermal requirements, electrostatic discharge (ESD) requirements, and the management interface. OSFP-400 device support 8 lanes of 50 Gb/s (400 Gb/s) using 560-PAM4 signaling. OSFP-800 device support 8 lanes of 100 Gb/s (800 Gb/s) using 112G-PAM4 signaling. OSFP MSA is working on an OSFP-XD (Extra Dense) specification which doubles number of channels and capacity of an OSFP-800. The OSFP-XD will support 16 lanes of 100 Gb/s to support 1.6 Tbps.

SFP devices are designed to be inserted within a cage and connector, which the cage and connector are attached to the host, typically a communication equipment. INF-8074i, Revision 1.0, May 12, 2001, SFP (Small Formfactor Pluggable) Transceiver provide cage and connector specifications for SFP devices. SFF Committee document SFF-8432 Rev 5.1 SFP+ provides specifications for the SFP+ module and cage. SFF-8071, Revision 1.10, Dec. 13, 2019, SFP+ 1×0.8 mm Card Edge Connector provide specifications on the 0.8 mm card edge connectors for SFP+, SFP28, and other SFP device variants. SFP-DD MSA, SFP-DD/SFP-DD112/SFP112, Revision 5.0, Oct. 1, 2021, provide cage and connector specifications for SFP112 and SFP Double Density (SFP-DD, SFP-DD112, SFP112) devices.

SFF-8682, Revision 1.1, Jun. 8, 2018, QSFP+4× Connector provide specifications on the physical requirements for the mating interface and physical embodiment of the 0.8 mm connector for QSFP+ and QSFP+ variant devices. SFF-8662, Revision 2.9, Jun. 8, 2018, QSFP+4×28 Gb/s Connector (Style A) provide specifications on the physical requirements for the mating interface and physical embodiment of the 28 Gb/s 0.8 mm connector for QSFP28 and QSFP28 variant devices. SFF-8672, Revision 1.2, Jun. 8, 2018, QSFP+4×28 Gb/s Connector (Style B) provide specifications on the physical requirements for the mating interface and physical embodiment of the 28 Gb/s 0.8 mm connector for QSFP28 and QSFP28 variant devices. Style B 0.8 mm connector addresses backward compatibility when mated to a connector.

QSFP-DD MSA, QSFP-DD/QSFP-DD800/QSFP112, Revision 6.2, Mar. 11, 2022 provide hardware specifications for QSFP Double Density (QSFP-DD) and QSFP112 pluggable devices and their variants.

SFP-8663, Revision 1.7, Oct. 19, 2017, QSFP+28 Gb/s Cage (Style A) provide specifications on the mechanical requirements on a 1×"n" ganged and 2×"n" stacked cage for a QSFP28 and QSFP28 variant devices. SFF-8683, Revision 1.3, Oct. 19, 2017, QSFP+ Cage provide specifications on the mechanical requirements on a 1×"n" ganged and 2×"n" stacked cage for a QSFP+ and QSFP+ variant devices. QSFP-DD MSA, QSFP-DI)/QSFP-DD800/QSFP112, Revision 6.2, Mar. 11, 2022 provide hardware specifications for QSFP Double Density (QSFP-DD) and QSFP112 pluggable devices and their variants. OSFP device mechanical form factor, cage connector, electrical interface, thermal requirements, electrostatic discharge (ESD) requirements, and the management interface. OSFP-400 device support 8 lanes of 50 Gb/s (400 Gb/s) using 56G-PAM4 signaling. OSFP-800 device support 8 lanes of 100 Gb/s (800 Gb/s) using 112G-PAM4 signaling.

Management Interface for SFP+ provides specifications for the management of SFP. SFP+, SFP28, and other SFP variant devices. This describes a register and memory map which provides alarms, warnings, vendor identity, SFP description and type, SFP real time diagnostic, and vendor specific registers. This information is to be used by the SFP host equipment. SFF-8636, Rev 2.10a, Sep. 24, 2019, Management Interface for 4-lane Modules and Cables provide specifications for the management of 4-channel pluggable transceivers (QSFP, QSFP+, QSFP28, QSFP56, and QSFP variants) and 4-channel managed external cables. Common Management Interface Specification (CMIS), Revision 5.1, Nov. 2, 2021 provide specifications for the generic management of SFP Double Density (SFP-DD), QSFP Double Density (QSFP-DD), OSFP, COBO, and QSFP devices, and their respective variants.

802.11 is a set of media access control (MAC) and physical layer (PHY) specifications for implementing wireless local area network (WLAN) computer communication in the 2.4, 3.6, 5, and 60 GHz frequency bands. They are created and maintained by the IEEE LAN/MAN Standards Committee (IEEE 802). The base version of the standard was released in 1997, and has had subsequent amendments. The standard and amendments provide the basis for wireless network products using the Wi-Fi brand. While each amendment is officially revoked when it is incorporated in the latest version of the standard, the corporate world tends to market to the revisions because they concisely denote capabilities of their products. As a result, in the market place, each revision tends to become its own standard.

The 802.11 family consists of a series of half-duplex over-the-air modulation techniques that use the same basic protocol. 802.11-1997 was the first wireless networking standard in the family, but 802.11b was the first widely accepted one, followed by 802.11a, 802.11g, 802.11n, and 802.11ac. Other standards in the family (c-f, h, j) are service amendments and extensions or corrections to the previous specifications.

802.11b and 802.11g use the 2.4 GHz ISM band, operating in the United States under Part 15 of the U.S. Federal Communications Commission Rules and Regulations. Because of this choice of frequency band, 802.11b and g equipment may occasionally suffer interference from microwave ovens, cordless telephones, and Bluetooth devices. 802.11b and 802.11g control their interference and susceptibility to interference by using direct sequence spread spectrum (DSSS) and orthogonal frequency division multiplexing (OFDM) signaling methods, respectively. 802.11a uses the 5 GHz U-NII band, which, for much of the world, offers at least 23 non-overlapping channels rather than the 2.4 GHz ISM frequency band, where adjacent channels overlap—e.g., WLAN channels. Better or worse performance with higher or lower frequencies (channels) may be realized, depending on the environment.

The segment of the radio frequency spectrum used by 802.11 varies between countries. In the US, 802.11a and 802.11g devices may be operated without a license, as allowed in Part 15 of the FCC Rules and Regulations. Frequencies used by channels one through six of 802.11b and 802.11g fall within the 2.4 GHz amateur radio band. Licensed amateur radio operators may operate 802.11b/g devices under Part 97 of the FCC Rules and Regulations, allowing increased power output but not commercial content or encryption.

Bluetooth is a wireless technology using short-wavelength UHF radio waves in the ISM band from 2.4 to 2.485 GHz from fixed and mobile devices, and in-building networks. Invented by telecom vendor Ericsson in 1994, it was originally conceived as a wireless alternative to RS-232 data cables. It can connect several devices, overcoming problems of synchronization. Bluetooth is managed and oversees the development of the specification and manages the qualification program. Bluetooth technology is a global wireless communication standard that is present on a majority of mobile devices.

Bluetooth Low Energy (BLE) has evolved to develop a specification for a mesh network, Bluetooth Mesh Network, Version 1.0.1, Revision Date Dec. 2, 2020. BLE Mesh Network allows where every BLE IoT device can communicate with every other device within the same network and extends the distance and scope overall communication of a BLE IoT network.

ZigBee is an IEEE 802.15.4-based specification for a suite of high-level communication protocols used to create personal area networks with small, low-power digital radios. Its low power consumption limits transmission distances to 10-100 meters line-of-sight, depending on power output and environmental characteristics. ZigBee is typically used in low data rate applications that require long battery life and secure networking. ZigBee has a defined rate of 250 kbit/s, best suited for intermittent data transmissions from a sensor or input device.

Zigbee is capable of a Mesh Network as defined in an IEEE Standard 802.15.4-200. Zigbee Mesh Network addresses low-power and close distance IoT systems.

Wi-Fi has become a very ubiquitous, cost effective, and popular wireless network technology. Service and Network Providers are increasing their Wi-Fi services as a cost effective technology to provide wireless services. These Providers typically deploy Wi-Fi services using a wireless router and an Ethernet Access Switch or Network Interface Device (NID). The Ethernet Access Switch or NID provides data transport to and from the telecommunication network. The wireless router provides the media conversion and protocol processing of the data received from the Ethernet Access Switch or NID. The Ethernet Access Switch or Network Interface Device will typically have one or more SFP ports. The SFP port will be populated with an SFP device, which the SFP device will connect to the wireless router with a cable, as illustrated in prior art FIG. 1.

Communication equipment will typically use a secondary technology to provide information on device status, identity, and configuration to other devices. This secondary technology can also be used to provision or configure the device or communicate information to other remote devices or systems. This secondary technology is typically a wired technology and requires the use of a cable. The device will have a DB9 connector or RJ45 modular jack if RS232 is the communication protocol, as shown in prior art FIG. 3A. The device can also use an RJ45 modular jack if Ethernet is the communication protocol, as shown in FIG. 3B. The disadvantage of using wired technology for secondary communication is the added cost of the cable and the requirement to have a cable of proper length, wiring, and matching physical connectors. The cable also restricts the mobility of both the devices, where both devices must remain stationary to facility efficient communications.

Mobile devices such as smart phones, tablets, or wearable devices and Internet of Things (IoT) devices cannot support large physical connectors such as a DB9 connector or an RJ45 modular jack. In addition, communications with mobile and wearable devices should not restrict the mobility of these devices.

SFP devices are very popular due to the low cost, standardization, and interoperability. SFP devices have endured many functional and mechanical changes. Since the initial development of the SFP in 2000, there have been many SFP improvements in functionality and mechanical form factor, such as XFP, X2, SFP, SFP+, QSFP, QSFP+, and CXP technologies. Presently, SFP support optical, wire, or coax services, such as Ethernet, SONET, Fiber Channel, DS3, DS1, video, etc. SFPs supporting optical fiber service use an LC or SC connector. SFPs supporting wired Ethernet or DS1 services use an RJ45 modular connector. SFPs supporting wired DS3 or video services use a coax connector.

SUMMARY

Generally, the SFP of the present disclosure comprises a small pluggable housing, a printed circuit board (PCB) located in the housing, and wireless circuitry. The small form factor pluggable unit, device or module of the present disclosure is provided with wireless capabilities, allowing for the provision of a versatile, cost effective and improved reliability of wireless communication services in a standard SFP. The small size and industry standard small pluggable form factor provides the framework for device interoperability, lower part costs, manufacturing, and supply chain optimization. Other wireless products are larger, have propriety or less popular form factor.

The wireless SFP of the present invention functions as a wireless Access Point (AP) or Station (STA). As a wireless AP (WAP), the present invention can be deployed as a cost-effective method to offload data traffic from cellular networks. As a wireless Station (STA), the present invention can be deployed as a cost-effective client or Internet of Things (IoT) solution for communication equipment supporting SFP devices. The recent advances in Wi-Fi technology augment the deployment of the cellular networks using cost-efficient wireless access points in unlicensed spectrum. The wireless SFP can be used in new and existing equipment which can house SFP devices.

The wireless SFP of the present invention also functions as a wireless Repeater. As a wireless Repeater, the present invention can be deployed as a cost-effective method to establish or extend wireless services from a weak wireless signal.

The wireless SFP of the present invention also functions as a wireless Bridge. As a wireless Bridge, the present invention can be deployed to link two networks.

The wireless SFP of the present invention provides performance monitoring and testing using applicable sections of IEEE 802.1ag, ITU Y.1731, ITU Y.1564, MEF30, MEF36, ITU Y.1564 and other similar standards or specifications. The wireless SFP of the present disclosure is also provided with remote testing capabilities, allowing for the provision of testing of wireless services through remote testing. Existing wireless products are not designed to have remote loopback testing capabilities and provide remote performance monitoring capabilities. Typical wireless routers or wireless access points are designed to be tested locally, requiring a person to be at the wireless router. Testing typically involves the measuring the wireless signal strength or the ability to poll or communicate to the wireless device. The wireless SFP of the present invention includes the ability to also perform intrusive loopback testing to verify the wireless service. These Remote testing and performance monitoring capabilities will allow the Service Providers to address the maintenance and troubleshooting of wireless services remotely, i.e., without local presence. The ability to provide performance monitoring and testing will increase the reliability and quality of the service of the wireless SFP.

The wireless SFP of the present invention is also provided with additional wireless communication channels or signals. The additional wireless communication channels or signals are used to communicate data to other devices, such as mobile devices, Internet of Things (IoT) devices, wearable devices, and other wireless SFP devices. Devices will communicate any of the following data: identity, position, status, events, and control. The additional wireless communication channels or signals can be Bluetooth, Zigbee, or any other wireless technology. Bluetooth is a wireless technology standard for exchanging data over short distances using short-wavelength UHF radio waves in the ISM band from 2.4 to 2.485 GHz. Bluetooth is typically used as a secondary wireless communication method of mobile devices. The use of a secondary wireless technology allows time and location of the wireless SFP of the present invention. The mobile or IoT device will communicate information using Bluetooth or Zigbee to the wireless SFP. The wireless SFP will be installed at the customer's building or premises at unpredictable locations. Wi-Fi and Bluetooth triangulation using the wireless technology incorporated into the wireless SFP of the present invention allows for the provision of location and tracking of the SFP, such that it is readily available or accessible during wireless service outage or maintenance.

The wireless SFP of the present disclosure is also provided with an internal antenna or with a port or connector for connecting an external antenna, to improve wireless service performance or SFP installation. The improvement in wireless service with an internal antenna is accomplished with positioning the SFP among the many communication equipment small pluggable receptacles. The improvement in wireless service with an external antenna is accomplished with the positioning of the external antenna for optimal wireless signal transmission and reception.

Accordingly, the SFP of the present disclosure provides a cost effective method of providing wireless communications, by providing wireless communications capabilities in an industry standard small pluggable form factor. The SFP of the present disclosure will improve wireless service by optimizing wireless performance through communications with other wireless devices. The SFP of the present disclosure further improves wireless service by providing an internal antenna or allowing for the attachment of an external antenna.

The wireless SFP of the present disclosure will also facilitate indoor or outdoor positioning systems (IOPS). IOPS is a system to locate wireless devices inside a structure using information collected by mobile or IoT devices and triangulation. The present disclosure uses a secondary wireless technology to communicate information to other wireless mobile devices. The communication with other wireless SFP and wireless mobile devices will allow time, location, and tracking information to be shared with the IOPS system or other similar Wi-Fi positioning systems. Wi-Fi and Bluetooth triangulation for IOPS data can be achieved using three wireless SFPs in a facility.

The SFP of the present disclosure also provides capabilities for the performance monitoring and testing of the wireless communication device for improved wireless serviceability and diagnostics of the wireless communication device. Further, the SFP of the present disclosure improves wireless service maintenance by providing a secondary wireless channel or signal, allowing the SFP to be serviced quickly and easily.

Accordingly, it is an object of the present disclosure to provide a small, low cost, and simple method and device to provide and service wireless communications into an industry standard small pluggable form factor.

It is another objective of the present disclosure to provide a SFP method and device which can be geographically located.

It is still another objective of the present disclosure to provide a SFP method and device which can communicate to other wireless devices.

It is still another objective of the present disclosure to provide a SFP method and device which can provide wireless performance information for remote access.

It is still another objective of the present disclosure to provide a SFP method and device which can provide remote testing of the wireless service.

It is still another objective of the present disclosure to provide a SFP method and device which can optimize wireless performance and installation by providing a wireless antenna to be internally or externally attached.

It is still another objective of the present disclosure to provide a SFP method and device which provides a secondary wireless communication channel to communicate to other wireless devices.

It is still another objective of the present disclosure to have an LED communicate information to animate and inanimate objects.

Additional objectives, advantages and novel features will be set forth in part in the description which follows, and in part will become apparent to those skilled in the art upon examination of the following and the accompanying drawings or may be learned by production or operation of the examples.

BRIEF DESCRIPTION OF THE DRAWINGS

The drawing figures depict one or more implementations in accord with the present teachings, by way of example only, not by way of limitation. In the drawing figures, like reference numerals refer to the same or similar elements.

FIG. 14 is a table describing the functionality of the wireless SFP of the present disclosure using a light emitting diode (LED).

FIG. 36 is a table illustrating SFP Device variants, speeds, technology, and SFP device and port compatibility.

DETAILED DESCRIPTION

The following description refers to numerous specific details which are set forth by way of examples to provide a thorough understanding of the relevant method(s), system(s) and device(s) disclosed herein. It should be apparent to those skilled in the art that the present disclosure may be practiced without such details. In other instances, well known methods, procedures, components, hardware and/or circuitry have been described at a relatively high-level, without detail, in order to avoid unnecessarily obscuring aspects of the present disclosure. While the description refers by way of example to wireless SFP devices and methods and systems, it should be understood that the method(s), system(s) and device(s) described herein may be used in any situation where wireless telecommunication services are needed or desired.

Figure 1:
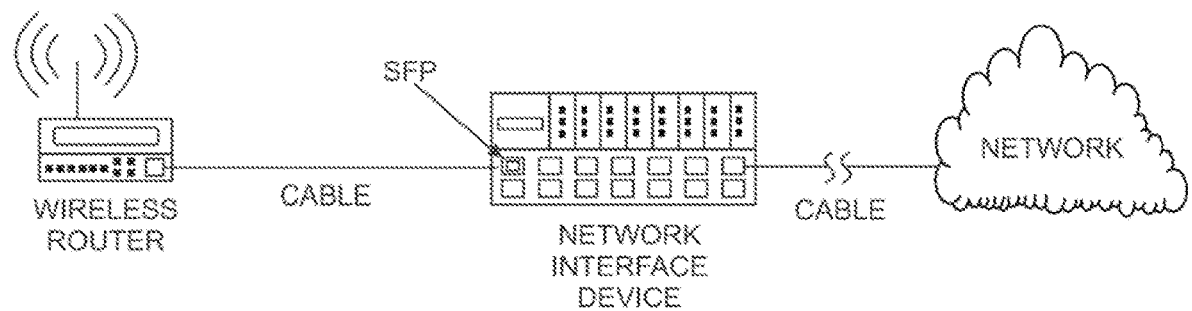
FIG. 1 is schematic diagram of a prior art telecommunication system for providing wireless service.
Figure 2:
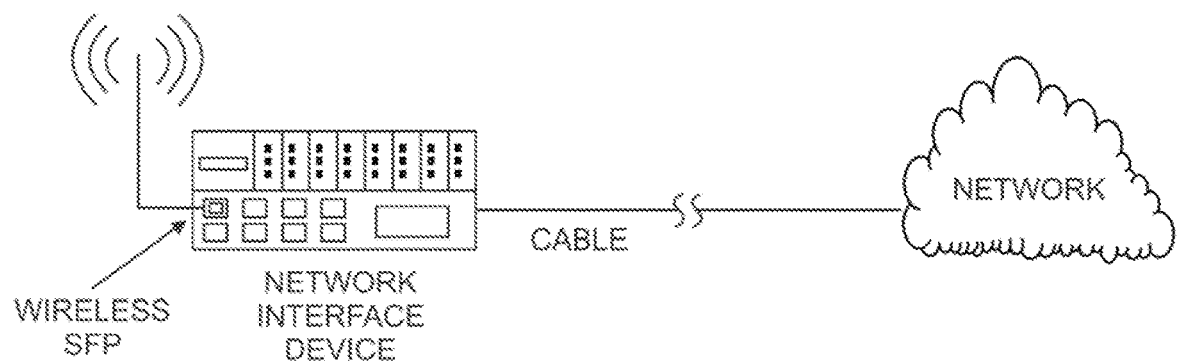
FIG. 2 is a schematic diagram of a telecommunication system for providing wireless service via the wireless SFP of the present disclosure.

As illustrated in FIG. 2, the wireless SFP device of the present disclosure replaces the Wi-Fi router, the SFP device in the NID, and the associated cabling and mounting hardware depicted in prior art FIG. 1. Due to the wireless SFP device conformance to applicable SFF specifications, the wireless SFP device can be installed and deployed by any equipment which supports SFP devices. In doing so, this allows any SFP supported equipment the added ability to provide wireless service. Further, the wireless SFP device of the present disclosure also simplifies the deployment and installation of wireless service by simply inserting the wireless SFP device into any equipment which supports SFP devices.

Figure 3A:
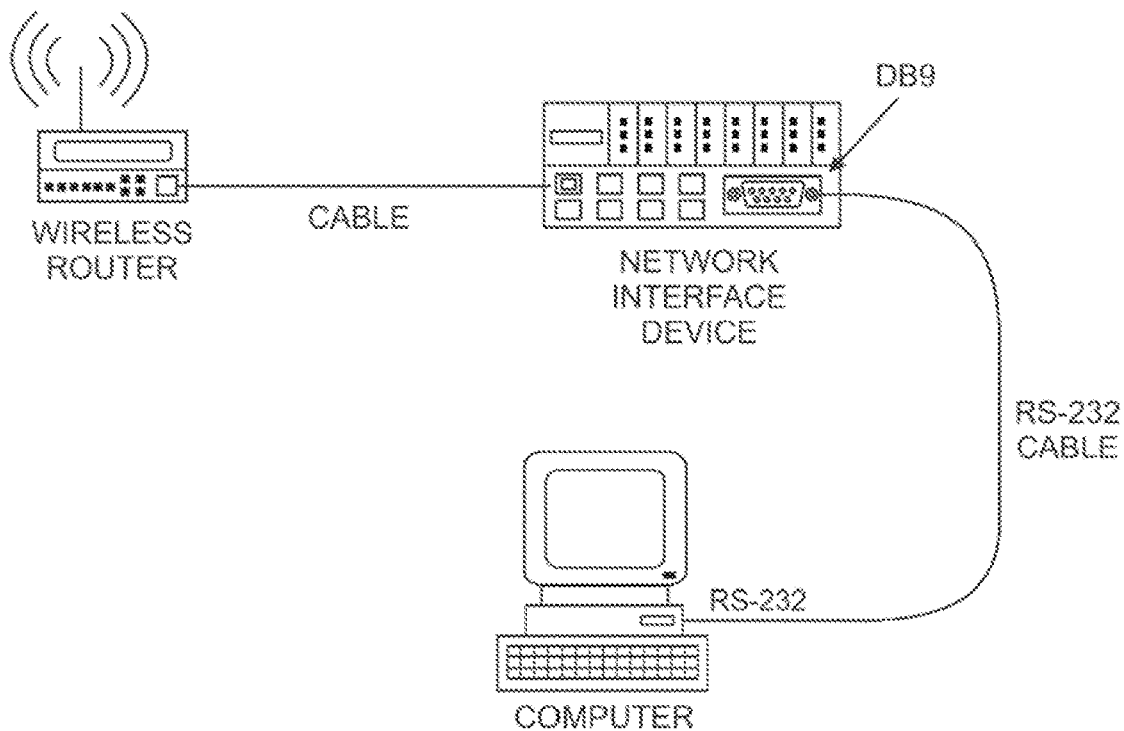
FIG. 3A is a schematic diagram of a prior art telecommunication system using cables and connectors to communicate with equipment.
Figure 3B:
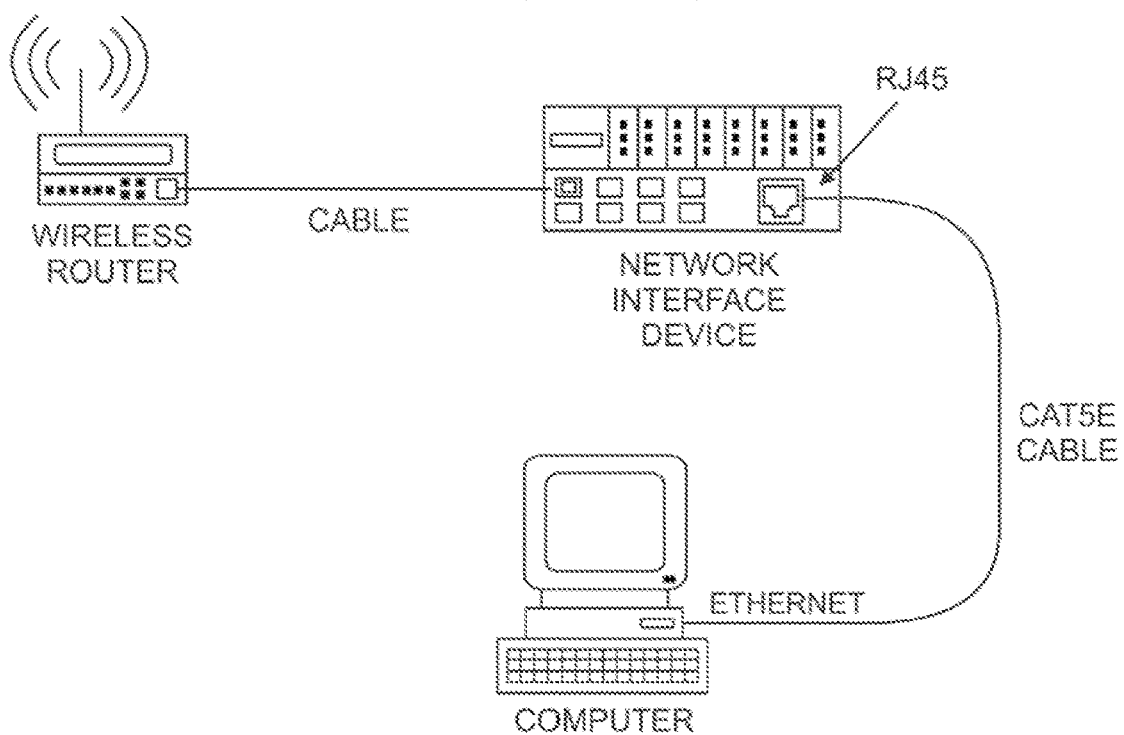
FIG. 3B is a schematic diagram of a prior art telecommunication system using alternate cables and connectors to communicate with equipment.
Figure 4:
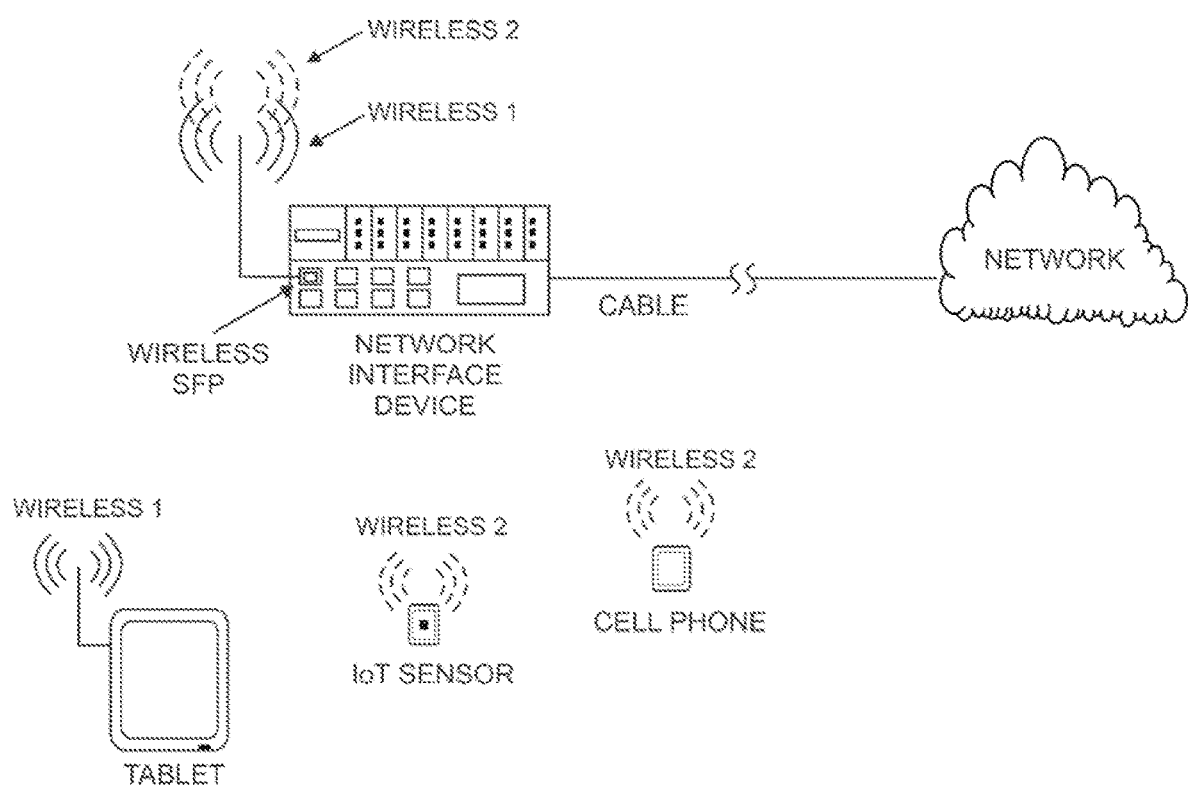
FIG. 4 is a schematic diagram of the telecommunication system of FIG. 2, illustrating the use of a secondary wireless technology to communicate with equipment.

Unlike the wired systems of prior art FIG. 3, a method and system of the present disclosure employs the use of a secondary wireless technology to communicate with equipment, as illustrated in FIG. 4. Accordingly, the wireless SFP of the present disclosure uses wireless as additional technologies to communicate with devices. This additional wireless technology will be different than the Wi-Fi wireless technology, which Wi-Fi used as the primary data transport for the network. There may be two or more wireless technologies used to communicate with other mobile and wearable devices.

Wi-Fi, Bluetooth, and Zigbee wireless technologies represent wireless technologies which one, two, or all these technologies will coexist. Bluetooth is a wireless technology standard for exchanging data over short distances using short-wavelength UHF radio waves in the ISM band from 2.4 to 2.485 GHz. Bluetooth is typically used as a secondary wireless communication method of mobile devices. The Wi-Fi and Bluetooth technologies incorporated into the wireless SFP of the present invention allows for the provision of location and tracking of the wireless SFP, such that it is readily available or accessible during wireless service outage or maintenance. The Wi-Fi and Bluetooth will also provide the infrastructure to manage and track mobile and wearable devices through indoor positioning systems.

The additional wireless technology may use a single antenna for coexistence of all wireless technologies, as shown in FIG. 4. The method and systems of the present disclosure will support multiple antennas to enhance the performance of the wireless technologies.

FIGS. 5A-9 illustrate a number of embodiments of the wireless SFP and associated antenna. The wireless SFP can support multiple wireless services, such as Wi-Fi, Bluetooth, Zigbee, and others. The associated antenna can be integrated in the wireless SFP device, or can be connected via a suitable connector.

Figure 5A:
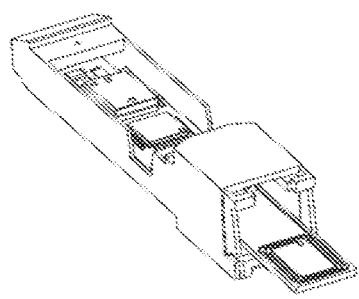
FIG. 5A is a top front perspective view of the wireless SFP of the present disclosure with an integrated antenna with the housing partially removed to illustrate internal components and internal PCB antenna.
Figure 5B:
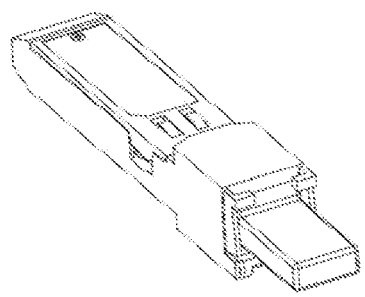
FIG. 5B is a top front perspective view of the wireless SFP of FIG. 5 with its housing.
Figure 5C:
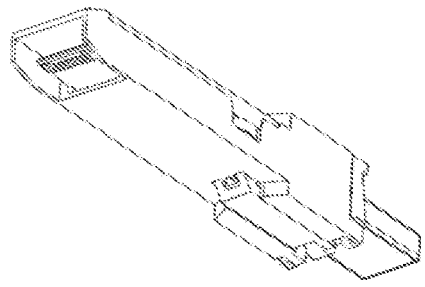
FIG. 5C is a bottom back perspective view of the wireless SFP of FIG. 5 with its housing.

For example, the antenna may be etched on a printed circuit board (PCB) internal of the SFP. FIGS. 5A-5C illustrate such an integrated, internal PCB antenna. In this embodiment, a connector for an external antenna is not needed and thus is eliminated.

Figure 6:
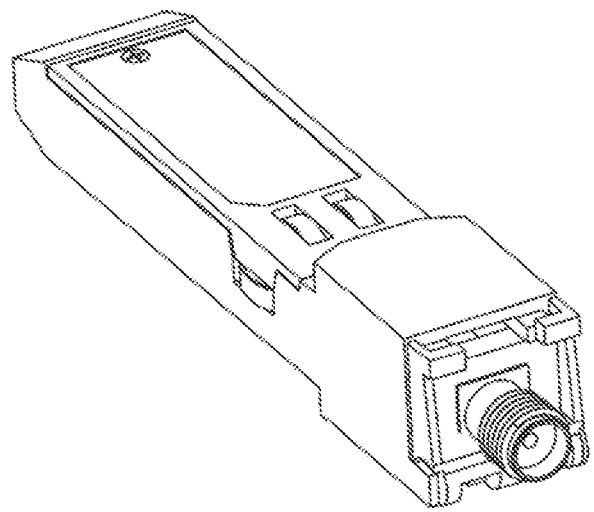
FIG. 6 is a perspective view of the wireless SFP of the present disclosure with a coaxial connector to attach an external antenna with a coaxial connector.
Figure 7:
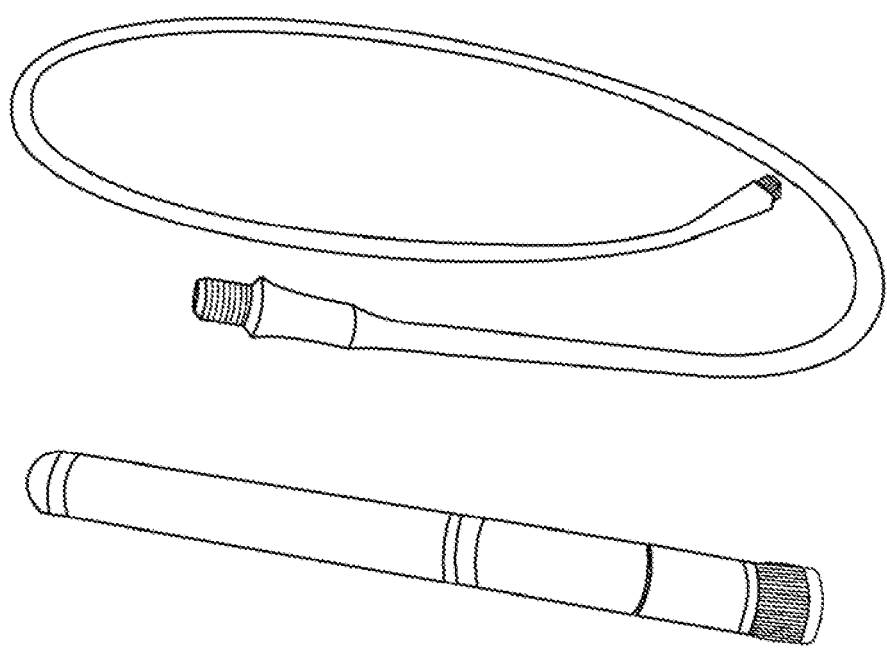
FIG. 7 is a perspective view of an external antenna with a coaxial connector and a coax cable attachment for use with the wireless SFP of FIG. 6.

In another embodiment, the wireless SFP includes a coax connector to support an external antenna. FIG. 6 illustrates the wireless SFP with such a coax connector. FIG. 7 illustrates an external antenna having a coaxial connector. The external antenna can be connected to the coax connector on the wireless SFP via a coax cable attachment as depicted therein.

Figure 8:
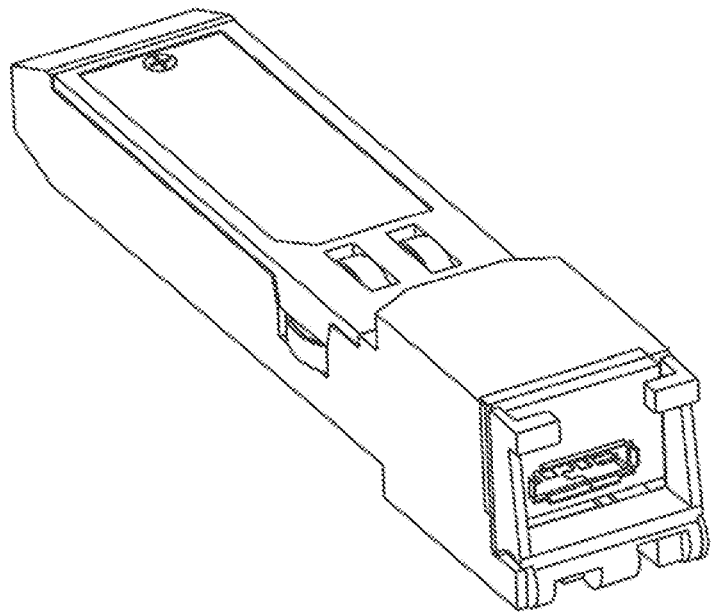
FIG. 8 is a perspective view of the wireless SFP of the present disclosure with a USB connector to attach an external antenna with a USB connector.
Figure 9:
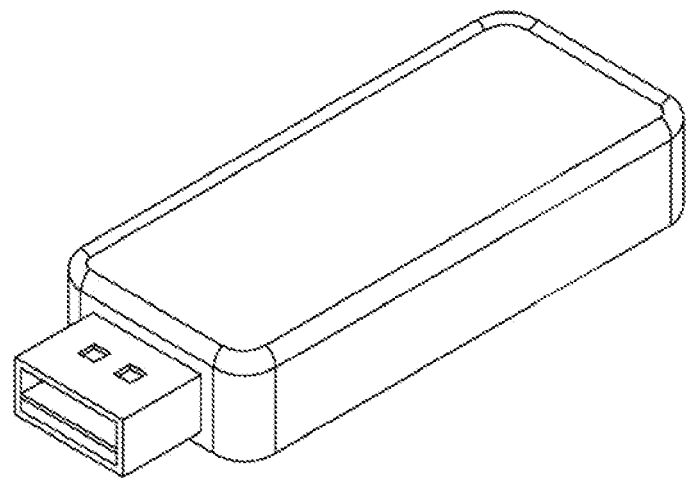
FIG. 9 is a perspective view of an external antenna with a USB connector for use with the wireless SFP of FIG. 8.

In an alternate embodiment, the wireless SFP includes a USB connector to support an external antenna. FIG. 8 illustrates the wireless SFP with such a USB connector. FIG. 9 illustrates an external antenna having a USB connector. The external antenna can be connected to the USB connector on the wireless SFP by plugging the complementary USB connector on the external antenna into the USB connector on the wireless SFP.

Figure 10:
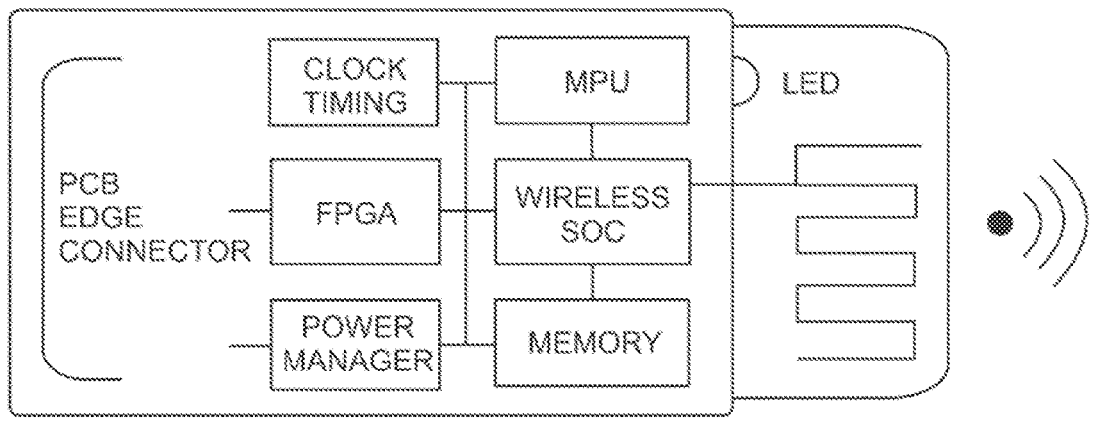
FIG. 10 is a schematic diagram of the printed circuit board of the wireless SFP of FIG. 5A, and illustrating the wireless SFP circuitry of the present disclosure.

FIG. 10 is a schematic diagram of the printed circuit board of the wireless SFP with internal antenna, and illustrating the wireless SFP circuitry. As can be seen, the wireless SFP circuitry includes (1) a wireless system on chip (SoC), (2) power supply circuitry, (3) one or more LEDs, (4) a microprocessor, (5) memory, and (6) a field programmable gate array (FPGA). The PCB also includes clock and timing circuitry, Antenna circuitry and an etched antenna. A back interface connector of the wireless SFP unit is also schematically illustrated, for connection to internal components of the network system when plugged into the chassis.

Figure 11:
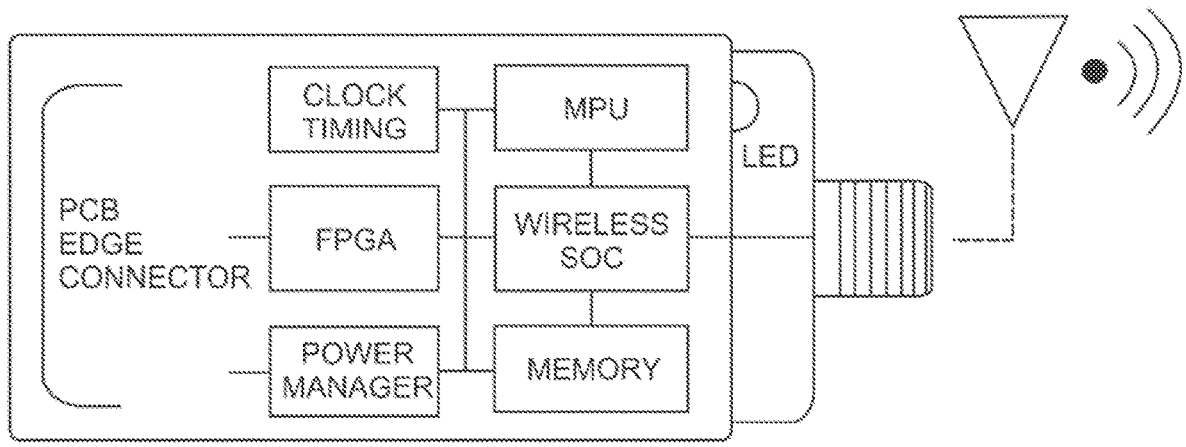
FIG. 11 is a schematic diagram of the printed circuit board of the wireless SFP of FIG. 6, and illustrating the wireless SFP circuitry.

FIG. 11 is a schematic diagram of the printed circuit board of the wireless SFP with external coax antenna, and illustrating the wireless SFP circuitry. As can be seen, the wireless SFP circuitry includes (1) a wireless system on a chip (SoC), (2) power supply circuitry, (3) light emitting diode (LED), (4) microprocessor, (5) memory, and (6) a field programmable gate array (FPGA). The PCB also includes clock and timing circuitry, Antenna circuitry and external coaxial connector for connection with an external antenna. A back interface connector of the wireless SFP unit is also schematically illustrated, for connection to internal components of the network system when plugged into the chassis.

Figure 12:
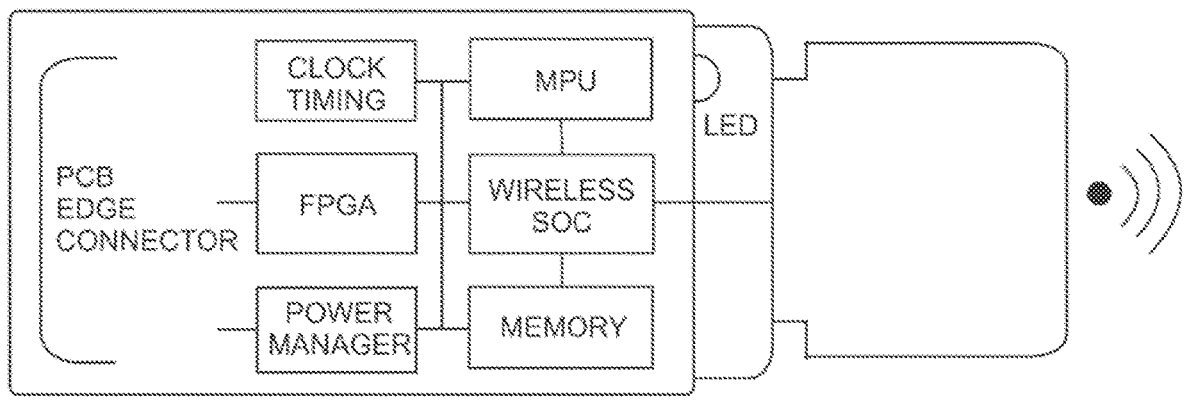
FIG. 12 is a schematic diagram of the printed circuit board of the wireless SFP of FIG. 8, and illustrating the wireless SFP circuitry.

FIG. 12 is a schematic diagram of the printed circuit board of the wireless SFP with external USB antenna, and illustrating the wireless SFP circuitry. As can be seen, the wireless SFP circuitry includes a (1) wireless system on a chip (SoC), (2) power supply circuitry, (3) light emitting diode (LED), (4) microprocessor, (5) memory, and (6) a field programmable gate array (FPGA). The PCB also includes clock and timing circuitry, Antenna circuitry and external USB type connector for connection with an external antenna. A back interface connector of the wireless SFP unit is also schematically illustrated, for connection to internal components of the network system when plugged into the chassis.

These components of the wireless SFP are described in more detail as follows:

(1) SoC Description

Figure 13:
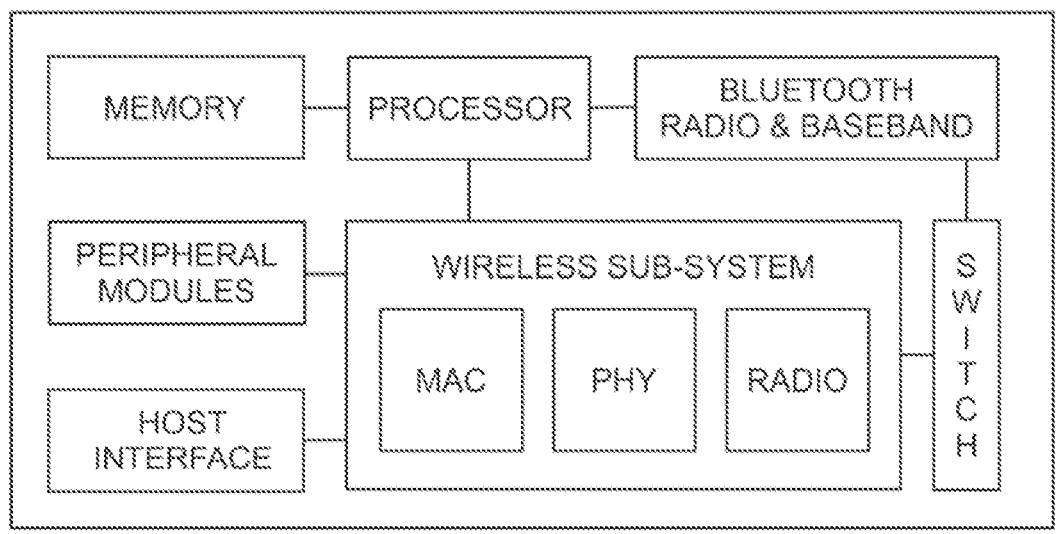
FIG. 13 is a schematic diagram of the wireless SoC chip of FIGS. 10-12.

The wireless SFP utilizes a wireless SoC, which is a highly integrated circuit incorporating a (1a) processor, (1b) wireless sub-system, (1c) Bluetooth sub-system, (1d) host interface, and (1e) peripheral modules. The wireless SoC also includes a memory and a switch. FIG. 13 is a schematic diagram of the wireless system on a chip (SoC).

(1a) SoC Processor

The wireless SoC processor is a 32-bit ARM Cortex type processor which offers high CPU performance and is optimized for low interrupt latency, low power consumption, in a very small size. The processor provides protocol processing for the Wireless and Bluetooth sub-systems. The processor also provides other general status and maintenance tasks.

(1b) SoC Wireless Sub-System

The SoC wireless sub-system includes an 802.11 a/b/g/n/ac radio, physical layer interface (PHY), and media access controller (MAC). The radio is a dual-band WLAN RF transceiver that has been optimized for use in 2.4 GHz and 5 GHz. The radio provides communications for applications operating in the globally available 2.4 GHz unlicensed ISM or 5 GHz U-NII bands. The wireless PHY provides signal processing, modulation and decoding of the received signal from wireless medium. The wireless MAC controls the access to the wireless PHY and mediates data collisions. The wireless MAC are comprised with transmit and receive controllers, transmit and receive FIFOs to buffer sending and receiving data, and circuitry to manage the RF system and the wireless PHY. The SOC wireless sub-system will interface to the antenna either through an antenna connector or without the antenna connector by means of an antenna etched on an extended PCB. The etch PCB antenna can achieve performance of 2 dB with minimal increase in the wireless SFP size. The use of an external antenna can achieve performance of 5 dB and the flexibility to position the external antenna by mean of a coaxial cable, as discussed above. The SoC will also support other wireless technologies such as IMT-2000 (4G), IMT-2020 (5G), and LoRa® and LoRaWAN® (trademarks of Semtech) exclusively or in combination with other wireless technologies.

(1c) SoC Bluetooth Sub-System

The SoC Bluetooth sub-system also includes an integrated Bluetooth radio and baseband core. The Bluetooth radio and baseband core is optimized for use in 2.4 GHz to provide low-power, low-cost, robust communications for applications operating in the globally available 2.4 GHz unlicensed ISM band. It is fully compliant with the Bluetooth Radio Specification and EDR specification and meets or exceeds the requirements to provide the highest communication link quality. Bluetooth Baseband Core (BBC) implements all of the time critical functions required for high-performance Bluetooth operation. The BBC manages the buffering, segmentation, and routing of data for all connections. It also buffers data that passes through it, handles data flow control, schedules transactions, monitors Bluetooth slot usage, optimally segments and packages data into baseband packets, manages connection status indicators, and composes and decodes packets and events. To manage wireless medium sharing for optimal performance, an external coexistence interface (switch) is provided that enables signaling between the one or two external collocated wireless devices such as Bluetooth.

(1d) SoC Host Interface

The SoC host interface supports SDIO circuitry for high speed data transfer from the wireless sub-system to the wireless SFP FPGA circuitry. The invention supports SDIO version 3.0, 4-bit modes (200 Mbps). The SoC host interface may also support an Ethernet RMII/GMII/RGMII/SGMII circuitry for 10/100/1000BASE-T and XAUI 10GBASE-T high speed data transfer.

(1e) SoC Peripheral Modules

The SoC peripheral modules support general purpose input and output control pins and serial communications to external devices.

(2) Power Supply Circuitry Description

The wireless SFP power supply circuitry is comprised of linear dropout and switching regulators to provide power to the wireless SoC, FPGA, processor, memory, and clock timing blocks. A power supervisor circuitry ensure proper power-up sequencing for hot-insertions and power brownout conditions.

(3) LED Description

FIG. 14 is a table describing the functionality of the wireless SFP using a light emitting diode (LED). The wireless SFP LED can communicate information on the wireless SFP. In this present disclosure, the wireless SFP has a single tri-color LE) to communicate status information on the wireless SFP system and both wireless communication technology. The present disclosure will use Wi-Fi and Bluetooth as the first and second wireless technology, respectively. When L) is emitting a steady green color, the wireless SFP is normal. Wi-Fi is linked and Bluetooth is idle. When the LEI) is only emitting a blinking green color, the Wi-Fi is communicating with other wireless devices while the Bluetooth communication is idle. When the LED is emitting only a steady blue color, the Bluetooth is linked while the Wi-Fi is idle. When the LE) is emitting only a blinking blue color, the Bluetooth is communicating with other wireless devices while the Wi-Fi is idle. If the LED is blinking green and blue with a 1 second cadence, the Wi-Fi and Bluetooth are both linked and communicating with their respective wireless devices. When LED is emitting a steady amber color, the wireless SFP is in test or maintenance mode, with wireless disabled. When L) is emitting a blinking amber color, the wireless SFP is in provisioning or upgrade mode. When LED is not emitting any color, there is no power or the wireless SFP is not operational. In is foreseen that the LED(s) will be able to communication data and information using very high frequency pulses such as Li-Fi technology. It is also contemplated that more than one LED may be used to indicate these and other features/status of the wireless SFP.

(4) Microprocessor Description

The microprocessor is an ARM Cortex processor system with the responsibility of managing and assisting the wireless SoC, the LED, and the FPGA. Additional responsibility of the microprocessor is to communicate to the host interface the SFP digital diagnostics monitoring per SFF-8472.

(5) Memory Description

The wireless SFP memory sub-system is comprised of ROM and RAM memory blocks. The ROM and RAM memory blocks will provide data software program and data storage and operation. The Flash ROM will also provide storage to mirror the software program. Mirroring will allow the wireless SFP to have remote software upgrades and provisioning.

(6) FPGA Description

Figure 15:
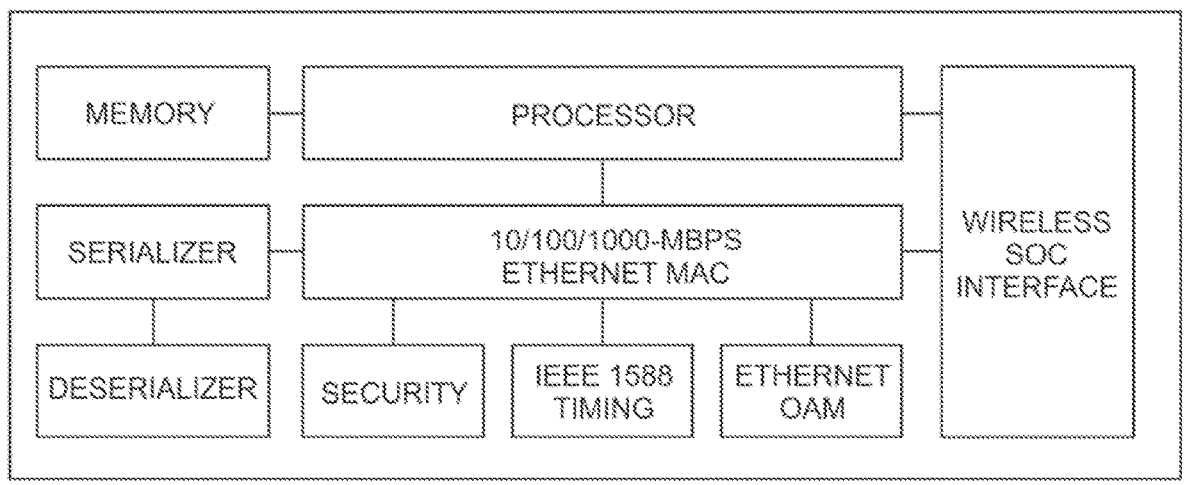
FIG. 15 is a schematic diagram of the wireless SFP field programmable gate array (FPGA) of FIGS. 10-12.

The wireless SFP FPGA provides the following sub-systems, an (6a) Ethernet MAC, an (6b) Ethernet precision timing circuitry, an (6c) Ethernet OAM (operation, administration, maintenance) circuitry, (6d) security circuitry, a (6e) host interface, and a (6f) processor. The FPGA also includes a memory and serializer and deserializer circuitry. FIG. 15 is a schematic diagram of the wireless SFP field programmable gate array (FPGA).

(6a) Ethernet MAC Description

The Ethernet MAC provides optional protocol processing of the data from the host interface. The MAC sublayer provides addressing and channel access control mechanisms. The Ethernet MAC functionality may be bypassed for customer applications, such as performing test, maintenance, or network architecture applications. The Ethernet MAC controller can transmit and receive data at 10/100/1000 Mbs. It is foreseen that the Ethernet MAC could support 10G, 40G, and 100 Gbs as well.

(6b) Ethernet Precision Timing Description

The Ethernet precision timing block provides IEEE 1588v2 and SyncE functions. IEEE 1588v2 is a standard that defines a Precision Time Protocol (PTP) used in packet networking to precisely synchronize the real Time-of-Day (ToD) clocks and frequency sources in a distributed system to a master ToD clock, which is synchronized to a global clock source. The Ethernet precision time block provides IEEE1588 and SyncE functionality. IEEE1588 standard defines the Precision Time Protocol (PIP) that enables precise synchronization of clocks in a distributed network of devices. The PTP applies to systems communicating by local area networks supporting multicast messaging. This protocol enables heterogeneous systems that include clocks of varying inherent precision, resolution, and stability to synchronize. In both the transmit and receive directions 1588 packets are identified and timestamped with high precision. Software makes use of these timestamps to determine the time offset between the system and its timing master. Software can then correct any time error by steering the device's 1588 clock subsystem appropriately. The device provides the necessary V/O to time-synchronize with a 1588 master elsewhere in the same system or to be the master to which slave components can synchronize.

(6c) Ethernet OAM Description

The Ethernet OAM provides link and service OAM functionality per MEF and ITU Y.1731. The Ethernet OAM supports the service activation test loopback of ITU Y.1564 and RFC2544. Link OAM per IEEE 802.1ag. The Ethernet OAM support latching loopback per MEF46.

(6d) Ethernet Security Description

The Ethernet security implements the DES and Triple-DES (3DES) encryption standards, as described in NIST Federal Information Processing Standard (FIPS) publication 46-3, incorporated herein by reference. Each encryption type offers a compromise between service application speed, FPGA logic area, and customer application. The Data Encryption Standard (DES) is a 64-bit block cipher which uses a 56-bit key to encrypt or decrypt each block of data. Given the short key length, DES has been proven to be susceptible to brute force attacks and so is no longer considered secure for general use. Triple-DES (3DES) strengthens the security by combining three DES operations; an encrypt, a decrypt, and a final encrypt; each using a 56-bit key. This increases the effective key length, improving security. However, latterly 3DES has been superseded by the faster Advanced Encryption Standard (AES) algorithm, although it still finds use in security protocols such as IPsec and SSI/TLS for legacy purposes.

(6e) Host Interface Description

The host interface performs the data conversion from the wireless SoC sub-system to an SDIO or Ethernet media independent interface format.

(6f) Processor

The processor is a dual-core ARM Cortex processor system. The processor will assist in protocol processing, data management, and system administration for all functional blocks within the FPGA. The process will assist the Ethernet MAC, the IEEE 1588, the Ethernet OAM, and the security functional blocks.

The following is a description of the data flow received (Receive Data Flow) in the wireless SFPs of FIGS. 10, 11 and 12.

Wireless signals are received by the wireless SFP wireless SoC's Radio through the antenna connector by means of an external antenna or without the connector by means of the etch PCB antenna. The antenna will filter and convert the wireless signal to an electrical signal, which the electrical signal will be received by the wireless SoC radio. The radio's transmit and receive sections include all on-chip filtering, mixing, and gain control functions. The wireless signals will then be processed by the wireless PHY. The wireless PHY is designed to comply with IEEE 802.11ac and IEEE 802.11 a/b/g/n single-stream specifications to provide wireless LAN connectivity supporting data rates from 1 Mbps to 433.3 Mbps for low-power, high-performance applications. The PHY has been designed to work in the presence of interference, radio nonlinearity, and various other impairments. It incorporates optimized implementations of the filters, FFT and Viterbi decoder algorithms. The PHY carrier sense has been tuned to provide high throughput for IEEE802.11g/11b hybrid networks with Bluetooth coexistence. Wireless signals from the PHY circuitry are then connected to a media access controller (MAC). The wireless MAC is designed to support high-throughput operation with low-power consumption. It does so without compromising the Bluetooth coexistence policies, thereby enabling optimal performance over both networks. In addition, several power saving modes have been implemented that allow the MAC to consume very little power while maintaining network-wide timing synchronization. The data from the MAC will then interface with the wireless SoC host interface, which will convert the data into an SDIO or Ethernet media independent format.

The wireless SoC data will then interface with the FPGA or ASIC. The FPGA or ASIC will either convert the SDIO data format or connect directly to the FPGA Ethernet MAC. The Ethernet MAC will provide protocol processing and update the data with IEEE 1588 or SyncE information. If required, the updated data from the Ethernet MAC will be encrypted by the security functional block. The data will be serialized and transmitted differentially at compatible voltage levels per the appropriate SFF specification document to the wireless SFP PCB edge connector.

The wireless data received from the Bluetooth will flow from the Bluetooth sub-system to the wireless SoC and SFP processor. The wireless SoC processor will inspect and process the data accordingly. The Bluetooth data may provide wireless mobile location, identity, status, etc., for the wireless SoC and SFP processor.

The following is a description of the data flow transmitted (Transmit Data Flow) in the wireless SFPs of FIGS. 10, 11 and 12.

The transmit data from the SFP PCB edge connector will interface with the FPGA. The FPGA will convert the serialized data format to the Ethernet MII format of the FPGA Ethernet MAC. The Ethernet MAC will provide protocol processing and update the data with IEEE 1588 or SyncE information. If required, the updated data from the Ethernet MAC will be encrypted by the security functional block. The transmit data from the FPGA will interface to the wireless SoC's host interface. The wireless SoC host interface will convert the transmit data to the SoC MAC for protocol processing. The transmit data will then interface to the SoC PHY and Radio. The SoC PHY and Radio will convert the transmit data RF signal to wireless using an external antenna attachment or the internal etched PCB antenna.

The Bluetooth wireless data will transmit from the wireless SFP and SoC processor to the wireless SoC Bluetooth sub-system. The transmit data from the Bluetooth sub-system will be interleaved by the Wi-Fi coexistence switch to either a connector for the external antenna or directly onto an etched PCB antenna. The Bluetooth data will be transmitted to other wireless SFP and wireless mobile devices. The data will consist of location, identity, status of all wireless SFP devices or wireless mobile devices, or IoT. The Bluetooth wireless data can also provide status information of the wireless SFP. The Bluetooth wireless data will also allow the wireless SFP to be provisioned, tested, and administered.

Figure 16:
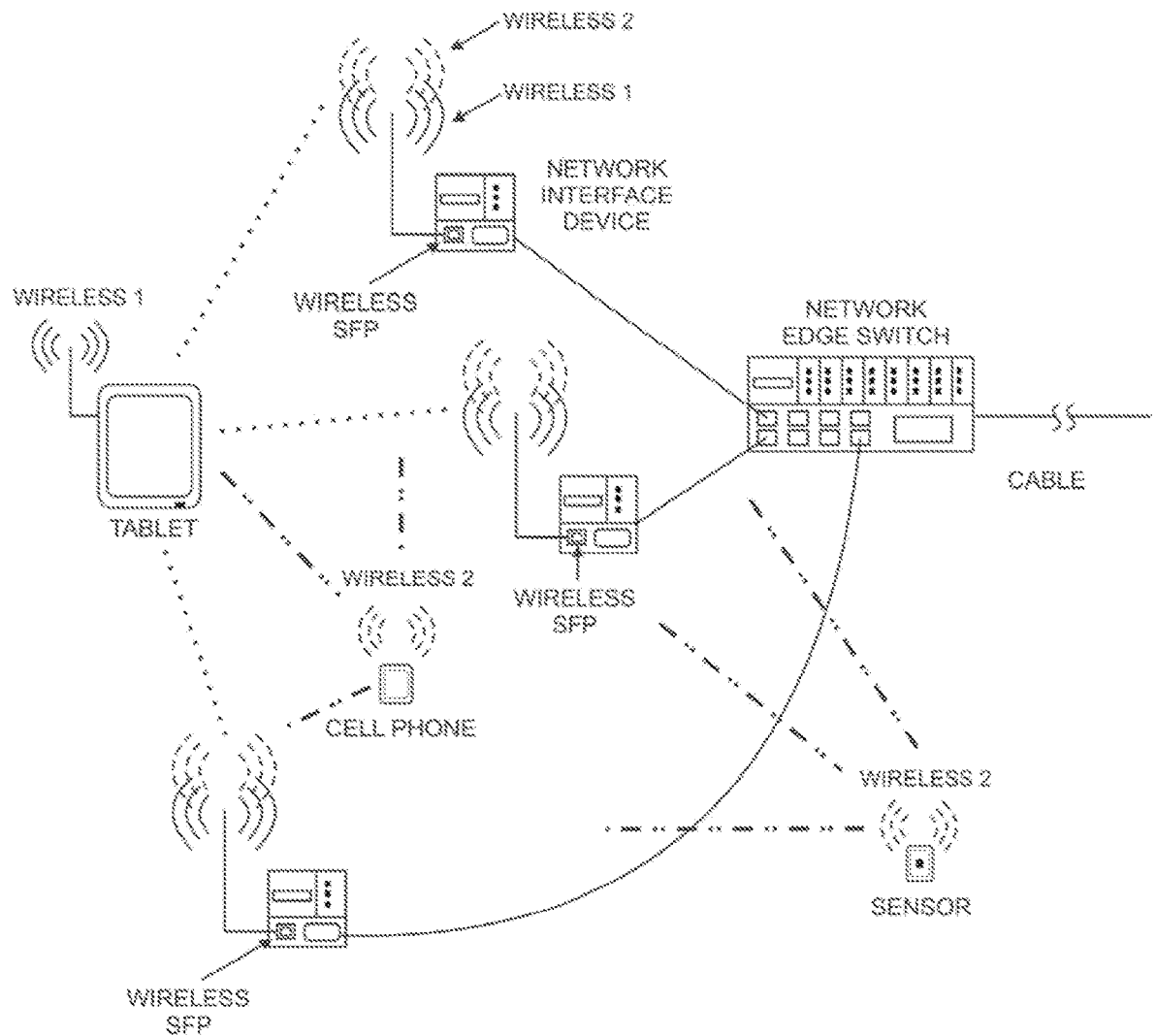
FIG. 16 is a schematic diagram illustrating a method of the present disclosure of Wi-Fi triangulation and Bluetooth communications involving three wireless SFPs and mobile devices.

FIG. 16 illustrates an exemplary embodiment of a method and system of the present disclosure used for Wi-Fi triangulation and Bluetooth communications involving three wireless SFPs and mobile devices. As illustrated, the three wireless SFP devices are placed into ports in three different network interface devices, each of which is connected to a network edge switch. These three wireless SFPs selectively communicate via both wireless 1 and wireless 2 signals with various devices. The signals can be triangulated such that the location of a device with a transmitter can be determined by measuring either the radial distance, or the direction, of the received signal from two or three different points, and the geographic position of the device can be pinpointed.

Figure 17:
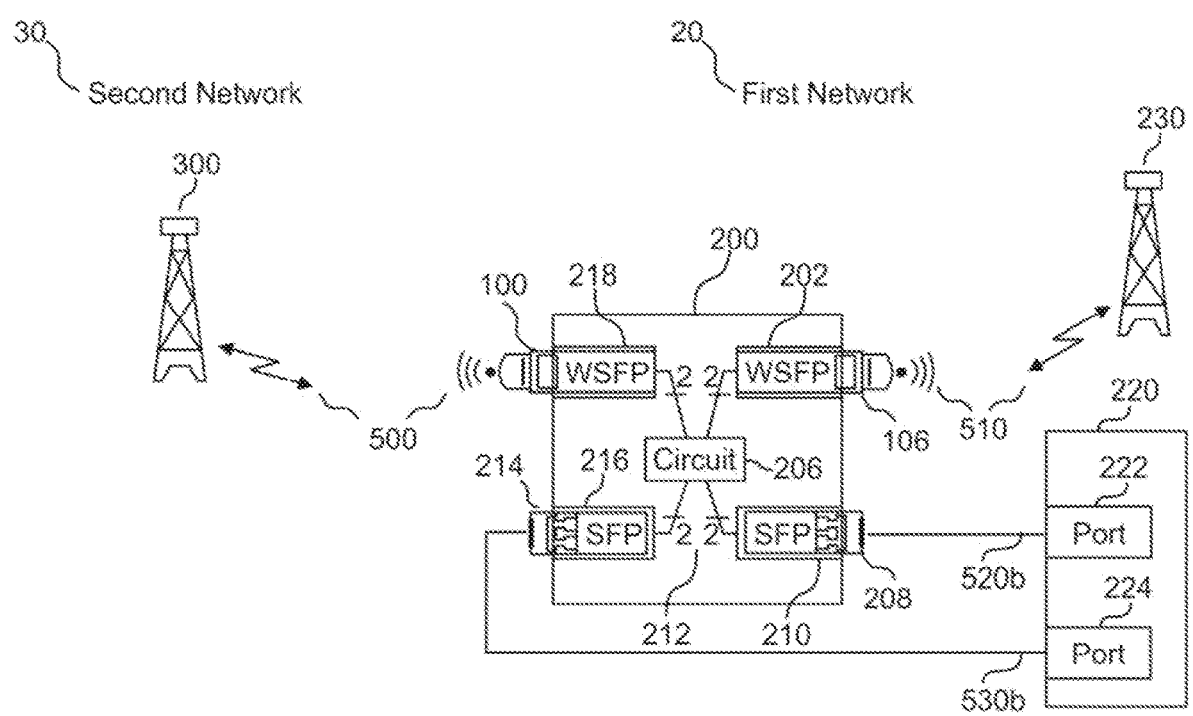
FIG. 17 is a schematic diagram of a telecommunication system illustrating the use of a wireless SFP as a wireless repeater.

FIG. 17 illustrates a diagram of another embodiment of the communications system and equipment of the present disclosure of a wireless Repeater between a First Network 20 and a Second Network 30. The wireless SFP (WSFP) Devices and communication equipment establishes a wireless Repeater between a First Network 20 and a Second Network 30. As disclosed in U.S. application Ser. No. 16/917,475 and U.S. Pat. No. 10,637,776, the communication equipment Device 200 hosts WSFP and SFP Devices and allows the communication service of the First Network 20 and Second Network 30 to be monitored, and/or injected, and or provide redundancy.

In this embodiment, the wireless signal extender or repeater is implemented by using two WSFP Devices 100 and 106 with the same wireless signal interface or WSFP device type. An example is WSFP Devices 100 and 106 supporting IEEE 802.11 (Wi-Fi) standard or both WSFP Devices supporting 4G and 5G. Although WSFP Devices 100 and 106 conform to the same wireless signal interface one or both of the WSFP Devices may be provisioned to have different wireless signal formats or options. As an example, the IEEE 802.11 standard defines operation for wireless networks in both the 2.4 GHz and 5 GHz frequency ranges. The 2.4 GHz band is defined into 11 channels (1-11) and the 5 GHz band can have 36 to 165 channels. Adjacent Channel Interference (ACI) and Co-Channel Interference (CCI) will result in Wi-Fi signal disruption and performance degradation when 2.4 GHz or 5 GHz channels overlap and conflict. A static channel plan or a vendor's dynamic channel assessment/assignment algorithm, a WSFP device with a IEEE802.11 (Wi-Fi) signal interface with a static or vendor's channel plan may require one or both WSFP Devices to be provisioned for different channels or other end-user requirements.

A wireless signal extender can address applications where the wireless signal does not have the signal strength to overcome physical distance and/or withstand impairments during the wireless transmission to the Second Network 30. A service provider network will typically use a wireless signal for wide area network or long reach applications, such as direct wireless, satellite, microwave, or cellular services LTE, IMT-2000 (4G) and IMT-2020 (5G). The WSFP Device provides for a specific or combination of wireless signals and formats, such as IEEE 802.11a, b, g, n, ac, ax (Wi-Fi) signal, IEEE 802.15, Bluetooth wireless signals, IMT-2000 (4G), IMT-2020 (5G), and LoRa® and LoRaWAN® (trademarks of Semtech), or in combinations with other IoT wireless signals (Bluetooth, Zigbee, Lora, etc).

The First Network 20 includes a Wireless Tower or Satellite Dish 230 and a Communication Equipment 220 having Ports 222 and 224. The First Network 20 also includes a communication equipment Device 200 having multiple Ports 202, 210, 216 and 218 as illustrated. As disclosed in U.S. application Ser. No. 16/917,475 and U.S. Pat. No. 10,637,776, the Device 200 hosts SFP devices and allows the communication service of the First Network 20 and Second Network 30 to be monitored, and/or injected, or provides redundancy. The Device 200 has a wireless SFP (WSFP) Device 106 connected to Port 202, a SFP Device 208 connected to Port 210, a SFP Device 214 connected to Port 216, and wireless SFP (WSFP) Device 100 connected to Port 218. The Device 200 also has Circuitry 206 which defines the signal paths between the Ports of the Device 200.

The Circuitry 206 is comprised of input and output differential amplifiers connected to multiplexer switches through Differential Paths 212.

The Second Network 30 includes a Wireless Tower or Satellite Dish 300 used for a wireless signal for wide area network or long reach applications, such as direct wireless, satellite, microwave, or cellular services LTE, IMT-2000 (4G) and IMT-2020 (5G). A wireless Signal 500 is used to interface the communication services between the First Network 20 and the Second Network 30 through Device 200, specifically connecting the wireless Signal 500 from WSFP Device 100 to the Wireless Tower or Satellite Dish 300 of the Second Network 30. The Device 200 in turn connects to the Wireless Tower 230 of the First Network 20 through a second wireless Signal 510, specifically connecting the WSFP Device 106 connected to Port 202 of Device 200 of the First Network 10. A cable 520b is used to monitor and/or test the communication services of the Second Network 30, specifically connecting SFP Device 208 to Port 222 of the Communication Equipment 220. A cable 530b is used to monitor, test, or provide redundancy to the communication services of the First Network 20, specifically connecting SFP Device 214 to Port 224 of the Communication Equipment 220.

Figure 18:
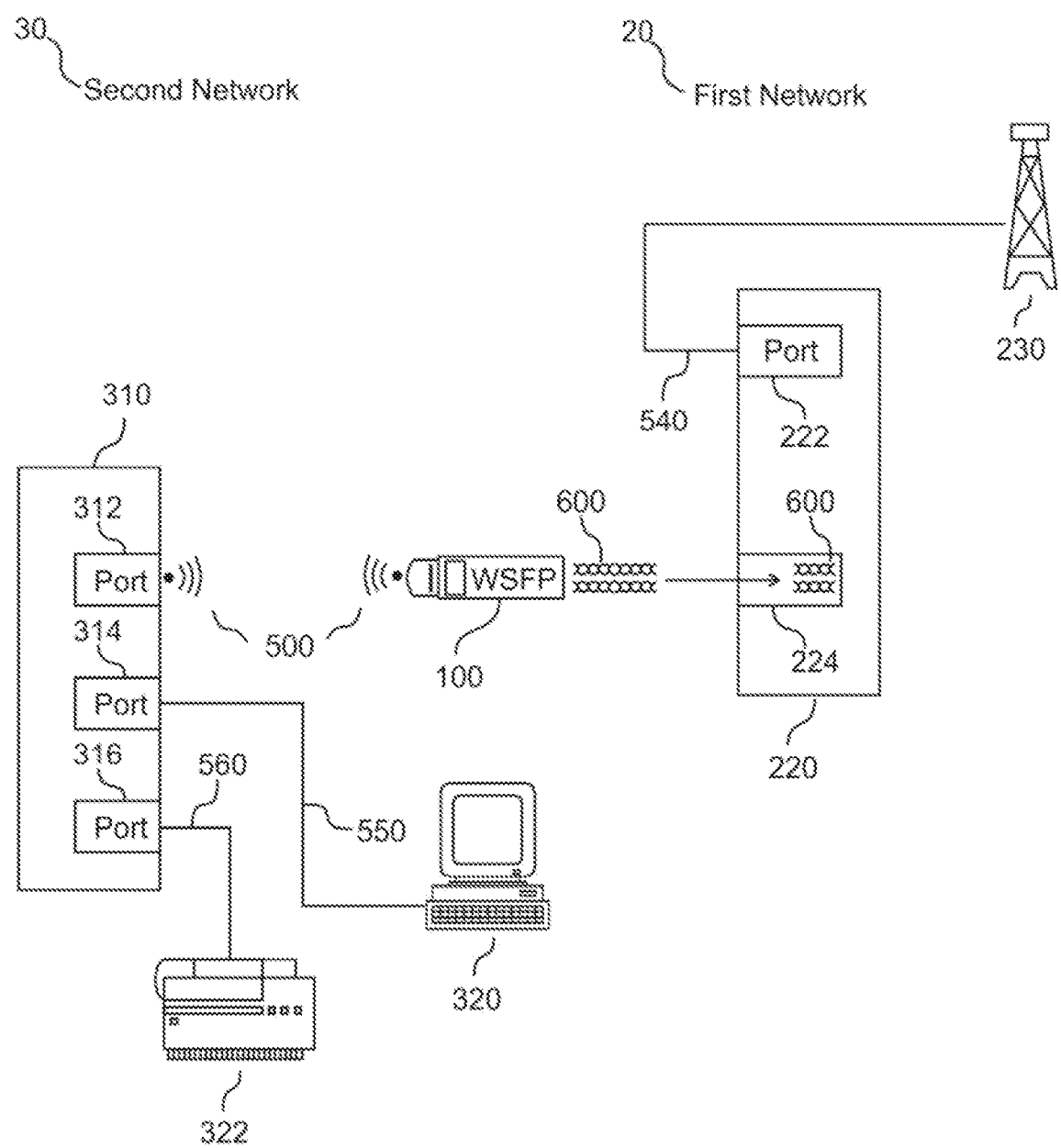
FIG. 18 is a schematic diagram of a telecommunication system illustrating the use of a wireless SFP as a wireless bridge.

FIG. 18 illustrates another exemplary embodiment of a method and system of the present disclosure for the wireless SFP Device of the present invention also functioning as a wireless Bridge. As a wireless Bridge, the present invention can be deployed as a cost-effective method to bridge communication services between networks. The wireless SFP (WSFP) Device 100 bridges communication services from a First Network 20 to Second Network 30. The WSFP Device 100 can also be used to bridge communications between sub-networks of a Network. In either application, the WSFP Device 100 bridges and connects two networks together over the wireless signal. The WSFP Device 100 will provide Layer 2 connection between the First Network 20 and Second Network 30. The WSFP Device 100 acts as a client to the Communication Equipment, where each end of the wireless bridge will provide a link within the same Subnet.

The First Network 20 includes Communication Equipment 220 having a Port 222 and Port 224. A Cable 540 connects Port 222 of the Communication Equipment 220 to the Service Provider Wireless Tower 230 of the First Network 20. Port 224 of the Communication Equipment 220 provides an SFP port for the WSFP Device 100. The Second Network 30 includes a Communication Equipment 310 with a wireless Port 312 and additional Ports 314 and 316. Port 314 connects to Computer 320 through Cable 550 and Port 316 connects to Printer 322 through Cable 560.

The WSFP Device 100 bridges the wireless communication services between the First Network 20 and the Second Network 30, specifically interfacing the wireless Signal 500 from wireless Port 312 of the Communication Equipment 310 of the Second Network 30. The WSFP Device 100 in turn connects and interfaces differential Signals 600 to the SFP Port 224 of Communication Equipment 220 of the First Network 20.

Figure 19:
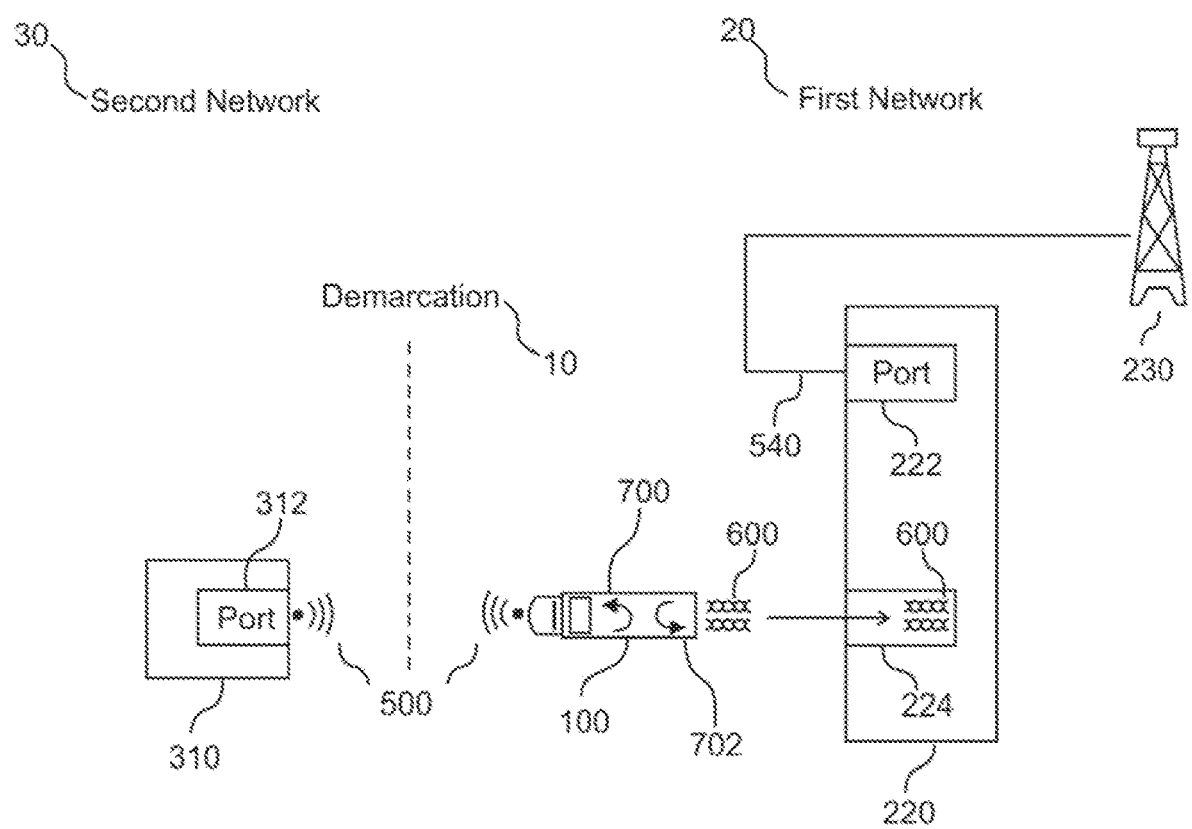
FIG. 19 is a schematic diagram of a telecommunication system illustrating the use of a wireless SFP as a wireless demarcation point.

FIG. 19 illustrates a diagram of another embodiment of the communications system and equipment of the present disclosure of a wireless demarcation point between a First Network 20 and a Second Network 30. A wireless demarcation point establishes a physical or virtual dividing line or boundary between the First Network 20 and a Second Network 30. A physical wireless demarcation point may consist of the wireless SFP (WSFP) Device 10. A virtual wireless demarcation point will be the wireless Signal 500 emanating from the WSFP Device 100. A physical or virtual wireless demarcation point will establish the responsibilities of wireless communication service performance, installation, and maintenance. The WSFP Device 100 will also provide testing functionality for fault sectionalization.

The First Network 20 includes Communication Equipment 220 having a Port 222 and Port 224. Port 222 of Communication Equipment 220 provides communication service from the Wireless Tower 230. Port 224 of Communication Equipment 220 provides communication service to the Second Network 30. The Second Network 30 includes a Communication Equipment 310 having a Port 312.

The First Network 20 establishes a Demarcation Point 10 with the WSFP Device 100 through Port 224 of the Communication Equipment 220 of the First Network 20. The WSFP Device 100 is used to interface the communication services between the First Network 20 and the Second Network 30, specifically interfacing the wireless Signal 500 from wireless Port 312 of the Communication Equipment 310 of the Second Network 30. The WSFP Device 100 in turn interfaces differential Signals 600 to Port 224 of the Communication Equipment 220 of the First Network 20. The Communication Equipment 220 in turn connects to the Wireless Tower 230 of the First Network 20 through a Cable 540.

The WSFP Device 100 can provide fault sectionalizing of the Second Network wireless communication service path by provisioning a signal Loopback 700 on the wireless Signal 500. The WSFP Device 100 establishes a signal Loopback 700 by receiving the wireless Signal 500 from the wireless Port 312 of the Communication Equipment 310 of the Second Network 30 and looping back this signal back to the wireless Port 312 of the Communication Equipment 310 of the Second Network 30.

The WSFP Device 100 can also provide fault sectionalizing of the First Network wireless communication service path by provisioning a signal Loopback 702 on the First Network communication service path. The WSFP Device 100 establishes a signal Loopback 702 by receiving the differential Signal 600 from Port 224 of the Communication Equipment 220 of the First Network 20 and looping back this signal back to Port 224 of the Communication Equipment 220 of the First Network 20.

Figure 20:
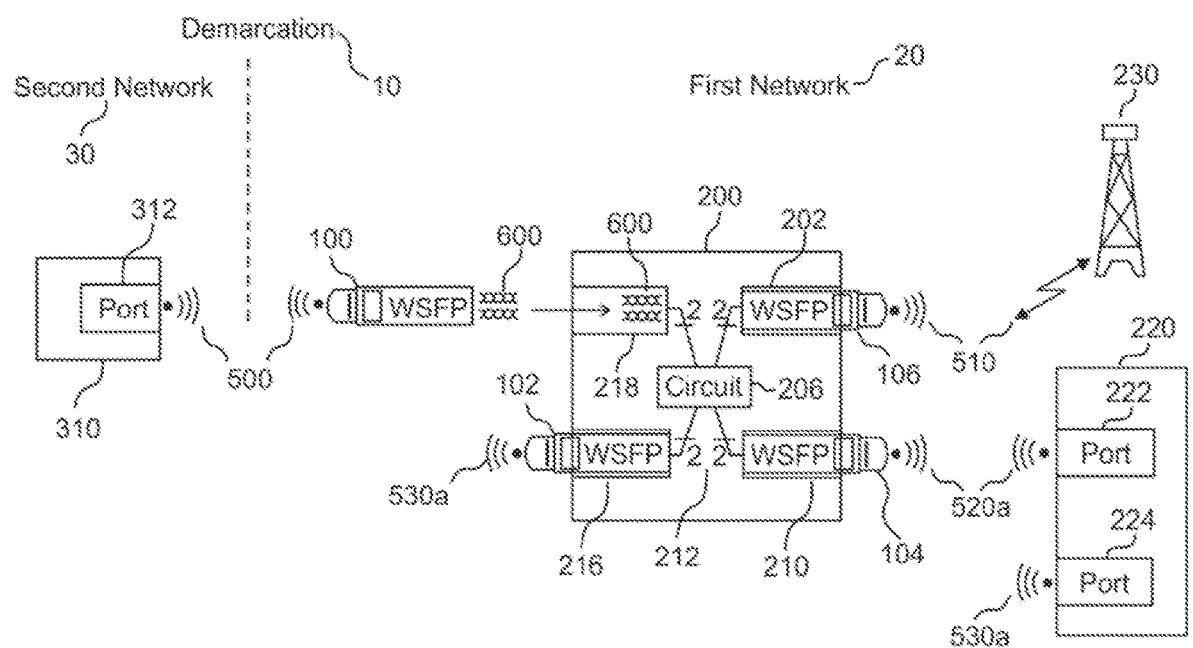
FIG. 20 is a schematic diagram of a telecommunication system illustrating another use of a wireless SFP as a wireless demarcation point.

FIG. 20 illustrates a diagram of another embodiment of the communications system and equipment of the present disclosure of a wireless demarcation point between a First Network 20 and a Second Network 30. A wireless demarcation point establishes a physical or virtual dividing line or boundary between the First Network 20 and a Second Network 30. A physical wireless demarcation point consists of the wireless SFP (WSFP) Device 100 or the WSFP Device 100 and the host communication equipment Device 200. A virtual wireless demarcation point will be the wireless Signal 500 emanating from the WSFP Device 100. The WSFP Device 100 will establish a Demarcation Point 10 between a First Network 20 and a Second Network 30 and for the communication service to be transported. As disclosed in U.S. application Ser. No. 16/917,475 and U.S. Pat. No. 10,637,776, the Device 200 hosts SFP devices and allows the communication service of the First Network 20 and Second Network 30 to be monitored, and/or injected, and or provides redundancy.

The First Network 20 includes a Wireless Tower 230 and a Communication Equipment 220 having wireless Ports 222 and 224. The wireless Ports 222 and 224 of the Communication Equipment 220 provide communication service monitor and/or test functions. The First Network 20 also includes a communication equipment Device 200 having multiple Ports 202, 210, 216 and 218 as illustrated and disclosed in U.S. application Ser. No. 16/917,475 and U.S. Pat. No. 10,637,776. Device 200 has a WSFP Device 106 connected to Port 202, a WSFP Device 104 connected to Port 210, a WSFP Device 102 connected to Port 216, and a WSFP Device 100 connected to Port 218. The Device 200 also has Circuitry 206 which defines the signal paths between the Ports of the Device. The Circuitry 206 is comprised of input and output differential amplifiers connected to multiplexer switches through Differential Paths 212.

The First Network 20 establishes a Demarcation Point 10 with the WSFP Device 100. The WSFP Device 100 is used to interface the communication services between the First Network 20 and the Second Network 30, specifically interfacing the wireless Signal 500 from wireless Port 312 of the Communication Equipment 310 of the Second Network 30. The WSFP Device 100 in turn interfaces differential Signals 600 to Port 218 of Device 200 of the First Network 20. The Device 200 in turn connects to the Wireless Tower 230 of the First Network 20 through a wireless Signal 510. A wireless Signal 520$a$ is used to monitor and/or test the communication services of the Second Network 30, or provide redundancy for the communication services transported by wireless Signal 510 of the First Network 20, specifically connecting WSFP Device 104 to the wireless Port 222 of the Communication Equipment 220. A wireless Signal 530$a$ is used to monitor and/or test the communication services of the First Network 20, or provide redundancy for the communication services transported by signal 500, specifically connecting WSFP Device 102 to Port 224 of the Communication Equipment 220.

Figure 21:
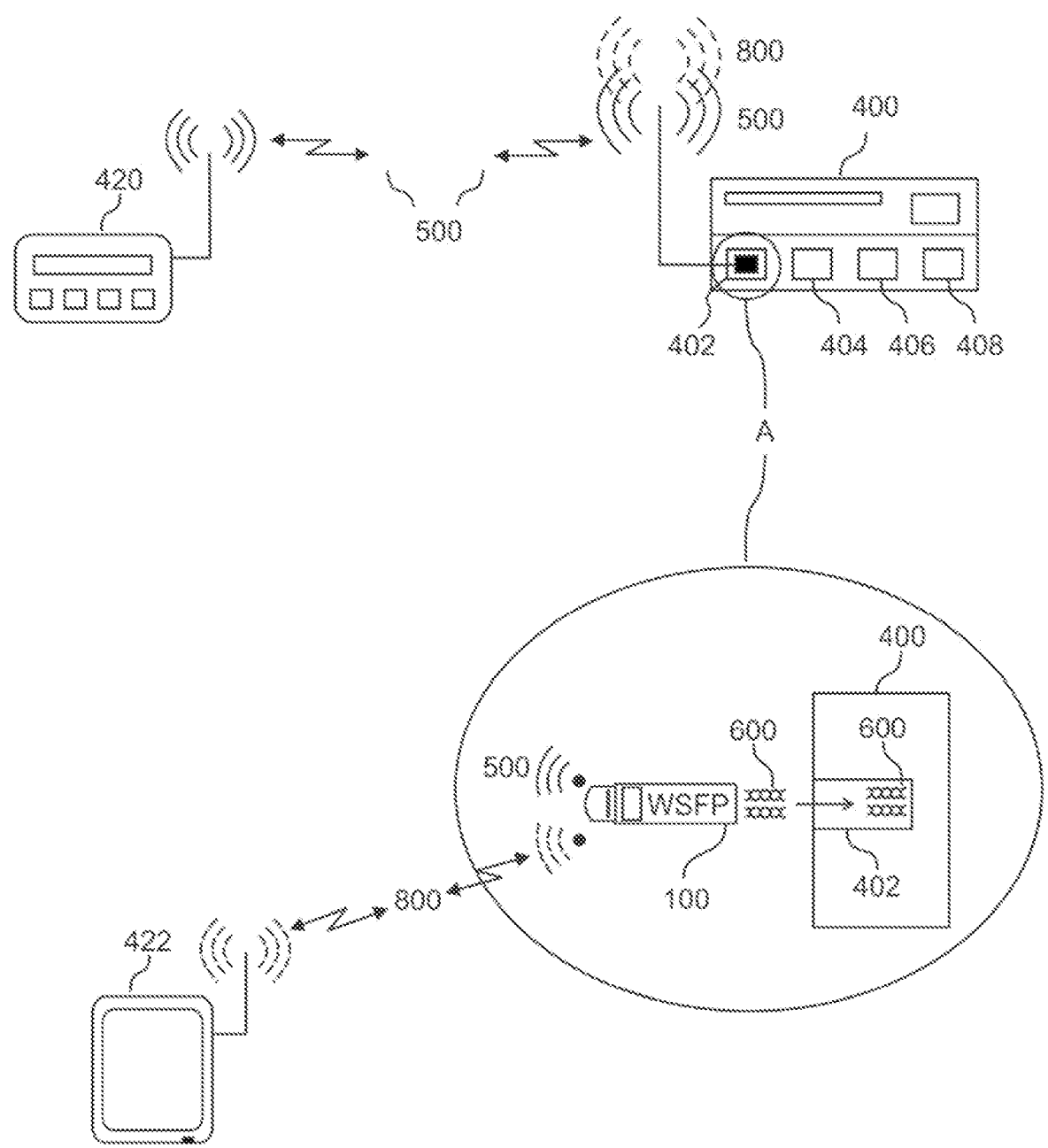
FIG. 21 is a schematic diagram of a telecommunication system illustrating the use of a secondary wireless technology for status, provisioning, and testing of the wireless SFP.

FIG. 21 illustrates the use of the wireless SFP (WSFP) Device 100 having a second wireless channel or Signal 800 for provisioning, authenticating, activating, monitoring, or testing. As previously discussed in the Background section above, the SFP devices are designed to be compliant to the industry standard SFF-8472 digital diagnostics monitoring (DDM) functions which defines management specifications on the SFP identity, status, provisioning, and other vendor specific information and controls. The DDM information is communicated between the communication equipment and the SFP device through a serial communication interface Inter-Integrated Circuit (I2C). This I2C interface is low speed serial communication protocol implemented using two electrical signals, which the electrical signal interface is located at the SFP device printed circuit board edge connector. When the SFP device is inserted into the communication equipment, the communication equipment may not recognize or accept the SFP. The communication equipment software database may not support or restrict the SFP device from proving status information, provisioning, or operating. This restriction is referred as "SFP Lockout", which the communication equipment will only allow specific SFP devices to be installed or activated. The Service Provider or Network Administrator may have operational, administration, and maintenance procedures which may require the SFP device to be monitored, provisioned, authenticated, activated, or tested independently from the communication equipment or in sequence with other operational procedures or equipment. As an example, the Service Provider's method and procedures for the installation of new communication services may require the wireless SFP to be pre-provisioned and tested before provisioning or activating the primary wireless signal, or activating the communication equipment. The ability to use the secondary wireless technology will provide the Service Provider or Network Administrator the ability to pre-provision, test, or manage the WSFP Device 100 without coordinating with the communication equipment without disruption or performance degradation of the wireless Signal 500. To provision, authenticate, and activate the WSFP Device 100 for 802.11 wifi service, the secondary wireless signal or channel will be used to set the Service Set Identifier (SSID) of the Network, the Band type (2.4 GHz, 5 GHz. Above 6 GHz, and other band types), channel number, encryption (Open, WEP, WPA, WPA2), functionality (Access Point or Station), IP Address, and other types of identification or configuration settings. Provisioning and activation for other wireless services such as 5G, LoRa, Zigbee would be similar in scope. QR code scan, zero-touch provisioning, or minimal touch provisioning are methodologies to minimize provisioning, authenticating, and activating the WSFP Device 100.

As illustrated in FIG. 21, the network includes Communication Equipment 400 having SFP Ports 402, 404, 406, and 408. Communication Equipment 420 is a wireless communication device such as a Router or Switch. The WSFP Device 100 provides wireless Signal 500 between Communication Equipment 400 and 420. The WSFP Device 100 provides a second wireless Signal 800 to a wireless Device 422. The second wireless Signal 800 allows the WSFP Device 100 to be provisioned, to provide status, or initiate tests of the wireless Signal 500, the WSFP Device 100, or the host Communication Equipment 400.

Oval circle A is an expanded illustration of the wireless WSFP Device 100 connected to Port 402 of the Communication Equipment 400, specifically interfacing and connecting the WSFP Device 100 differential Signals 600 to Port 402 of the Communication Equipment 400.

Figure 22:
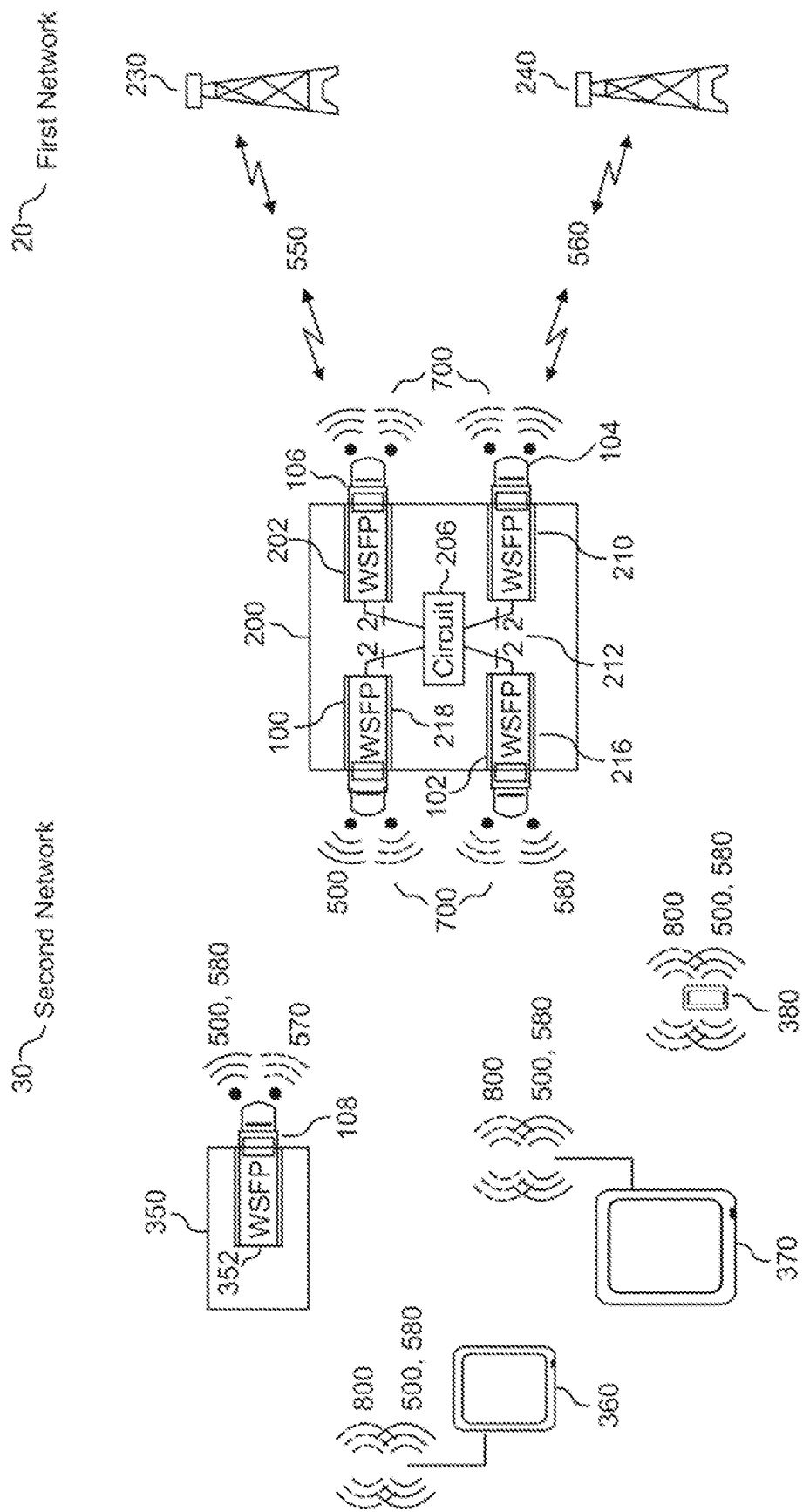
FIG. 22 is a schematic diagram of a telecommunication system illustrating the use of a secondary wireless technology for communications.

FIG. 22 illustrates another use of the wireless SFP (WSFP) Devices 100, 102, 104, and 106 secondary wireless Signal 800 to establish a wireless signal mesh network for wireless Signals 500 and 580 of the Second Network 30 and wireless signal redundancy for wireless Signals 550 and 560 of the First Network 20. The secondary wireless Signal 800 can also locate, monitor, and track other wireless devices. As disclosed in U.S. application Ser. No. 16/917,475 and U.S. Pat. No. 10,637,776, the Device 200 hosts SFP devices and allows the communication service of the First Network 20 and Second Network 30 to be monitored, and/or injected, redundancy, on-demand, or full cut-thru.

The First Network 20 includes a Wireless Tower 230 and 240. The Second Network 30 includes communication equipment Device 200 having multiple Ports 202, 210, 216 and 218 as illustrated and disclosed in U.S. application Ser. No. 16/917,475 and U.S. Pat. No. 10,637,776. Device 200 has a WSFP Device 106 connected to Port 202, a WSFP Device 104 connected to Port 210, a WSFP Device 102 connected to Port 216, and a WSFP Device 100 connected to Port 218. The Device 200 also has Circuitry 206 which defines the signal paths between the Ports of the Device. The Circuitry 206 is comprised of input and output differential amplifiers connected to multiplexer switches through differential Paths 212. The Second Network 30 also includes a Communication Equipment 350 having a WSFP Device 108 connected to Port 352, a Communication Equipment 360 with two wireless signals, a Communication Equipment 370 with two wireless signals, and a Communication Equipment 380 with two wireless signals.

A wireless Signal 550 is used to interface the communication services between the Wireless Tower 230 of the First Network 20 and the Device 200 of the Second Network 30, specifically connecting the wireless Signal 550 from WSFP Device 106 connected to Port 202 of Device 200 of the Second Network 200. The Device 200 in turn connects WSFP Device 100 and/or 102 to the WSFP Device 108 of Communication Equipment 350, and Communication Equipment 360, 370, and 380 with wireless Signal 500 and/or 580. The WSFP Device 100 and 102 can be provisioned as a Bridge, Repeater, or Access Point. The WSFP Devices 100 and 102 can use the second wireless Signal 800 to allocate, control, and divert wireless Signals 500 and 580 among WSFP Devices 100 and 102, and Communication Equipment 350, 360, 370, and 380. The WSFP Devices 100 and 102 can also use the secondary wireless Signal 800 to locate, monitor, and track Communication Equipment 350, 360, 370, and 380.

A wireless Signal 560 is used to interface the communication services between the Wireless Tower 240 of the First Network 20 and the Device 200 of the Second Network 30, specifically connecting the wireless Signal 560 from WSFP Device 104 connected to Port 210 of Device 200 of the Second Network 200. The Device 200 in turn connects WSFP Device 100 and/or 102 to the WSFP Device 108 of Communication Equipment 350 and Communication Equipment 360, 370, and 380 with wireless Signal 500 and/or 580. The WSFP Device 108 can be provisioned as a Bridge, Repeater, or Station. The WSFP Device 104 and 106 can use the second wireless Signal 800 to allocate, control, and divert wireless Signals 550 and 560 among WSFP Devices 104 and 106, and the Wireless Towers 230 and 240. The WSFP Devices 104 and 106 can also use the secondary wireless Signal 800 to locate, monitor, and track Communication Equipment 350, 360, 370, and 380.

Figure 23A:
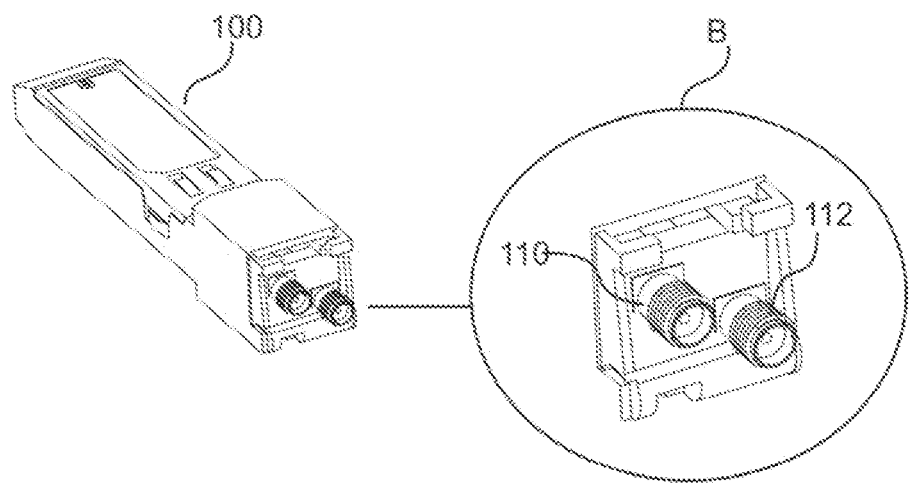
FIG. 23A is a perspective view of a wireless SFP with two SMA female coaxial connectors.
Figure 23B:
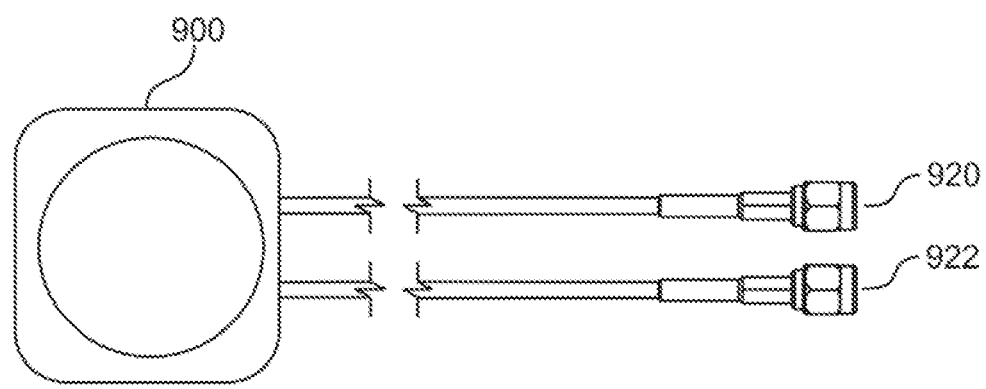
FIG. 23B is a perspective view of an external MIMO antenna.
Figure 23C:
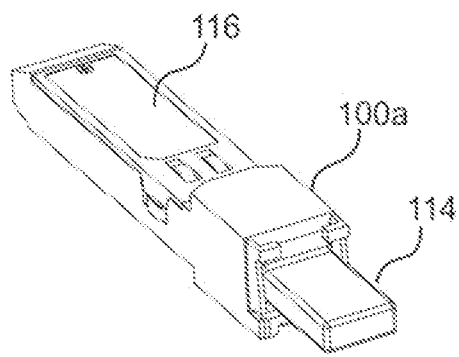
FIG. 23C is a top front perspective view of a wireless SFP with internal MIMO antennas.
Figure 23D:
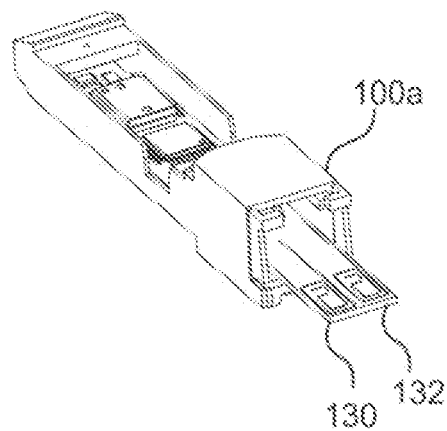
FIG. 23D is a top front perspective view of a wireless SFP of the present disclosure with an integrated antenna with the housing partially removed to illustrate internal components and internal PCB antenna.

FIG. 23A-C illustrates the wireless SFP (WSFP) Device 100 with two antennas. The WSFP Device 100 can increase the wireless signal performance, data bandwidth, and reliability by using multiple-input multiple-output (MIMO) antenna technology. MIMO antenna technology using two or more antennas increases wireless signal transmission distance, mitigates wireless signal interference, and increases wireless signal reliability. There are different technologies to achieve multiple antennas such as multiple-input multiple-output (MIMO), adaptive antennas, and fixed beam antennas. FIG. 23A is a perspective view of the WSFP Device 100 implementing MIMO antenna technology with female coaxial connectors. A Circle B illustrates an expanded view of the SMA female coaxial Connectors 110 and 112. FIG. 23B illustrates the external MIMO Antenna 900 with two coaxial cables with male SMA coaxial Connectors 920 and 922. The WSFP 100 Device female SMA coaxial Connectors 110 and 112 will connect to the external MIMO Antenna 900 male SMA coaxial Connectors 920 and 922. FIGS. 23C and 23D are perspective views of another embodiment of the WSFP Device 100a with MIMO antennas implemented with printed circuit board (PCB) traces. In FIG. 23C, WSFP Device 100a is shown with top housing 116 and antenna cover 114. In FIG. 23D, WSFP Device 100a is shown with top housing 116 and antenna cover 114 removed to illustrate the two printed circuit board (PCB) traces to function as PCB Antennas 130 and 132.

Figure 24A:
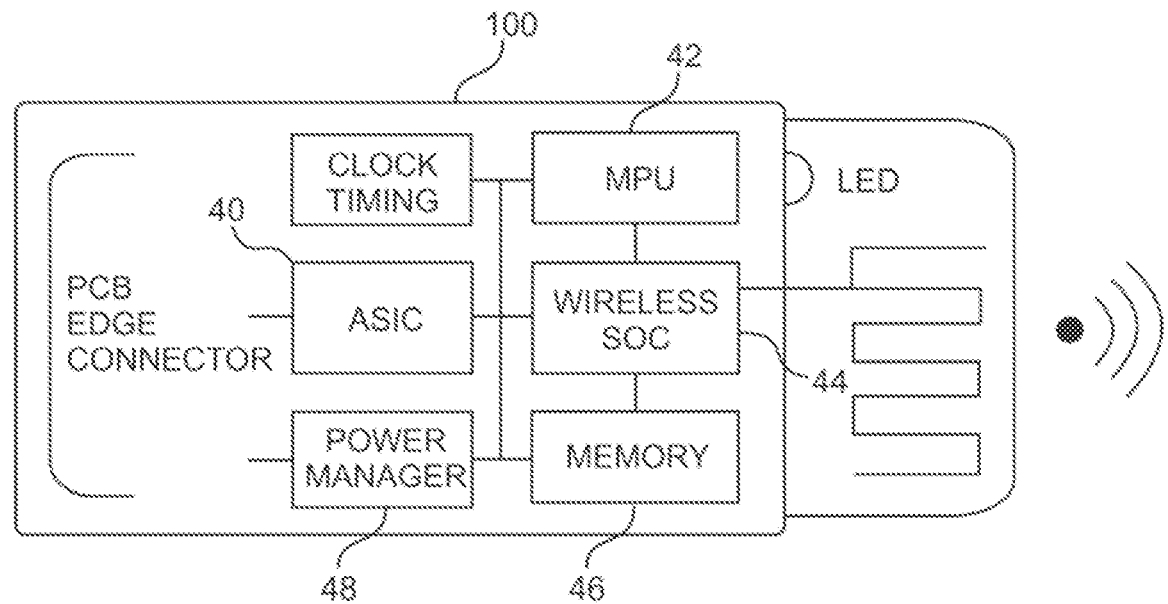
FIG. 24A is a schematic diagram of a wireless SFP using an ASIC to replace the FPGA circuitry.
Figure 24B:
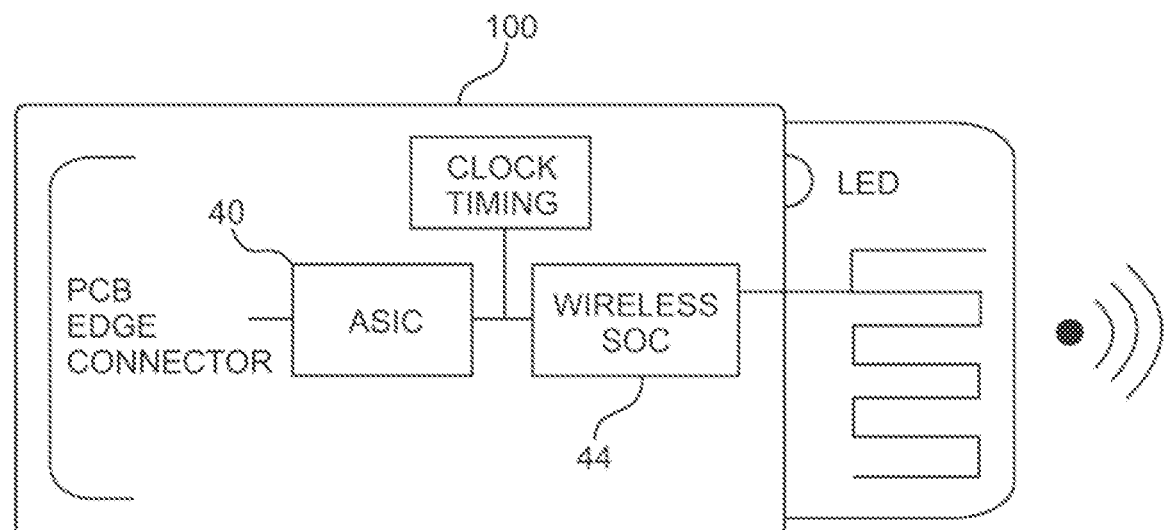
FIG. 24B is another schematic diagram of a wireless SFP using an ASIC to replace the FPGA and other circuitry.

FIGS. 24A and 24B illustrated the wireless SFP (WSFP) Device 100 using an Application Specific Integrated Circuit (ASIC) as a functional replacement to the FPGA as illustrated in the schematic of FIG. 15 and other circuitry. The ASIC will optimize the FPGA circuitry to yield an ASIC with lower material cost, testing cost, and power consumption. FIG. 24A is a schematic diagram of the wireless SFP using an ASIC to replace the FPGA. The Intel® eASIC™ devices are an example of a FPGA conversion to an ASIC device. The ASIC may also have a smaller physical device size to that of the FPGA. The ASIC can also integrate some or all other wireless WSFP Device 100 circuitry. FIG. 24B is a schematic diagram of the ASIC integrating the microprocessor unit (MPU) 42, Wireless SOC 44, Memory 46, and Power Manager 48 of FIG. 24A.

Figure 25:
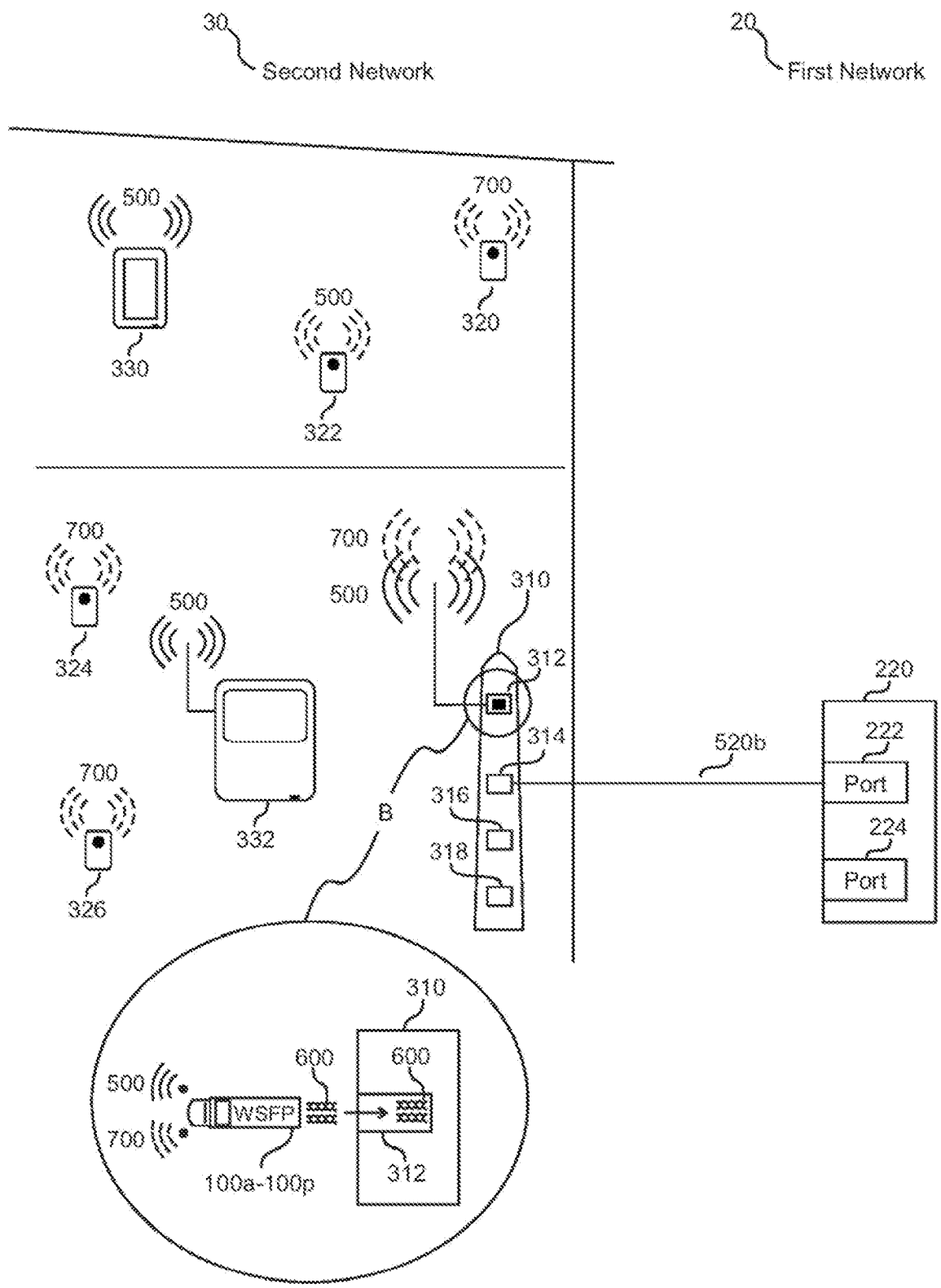
FIG. 25 is a schematic diagram of a telecommunication system illustrating the use of wireless SFP Device variants for the transport of communication services and use of a secondary wireless mesh technology.

FIG. 25 illustrates another exemplary embodiment of a method and system of the present disclosure for the wireless SFP (WSFP) Device of the present invention also functioning as a wireless transport of communication services. The present invention can be deployed as a method to transport a communication services between a First Network 20 and a Second Network 30, establish a secondary wireless mesh network for the Second Network 30, and transport a secondary communication services between a First Network 20 and a Second Network 30. The WSFP Device in this embodiment can be any WSFP Device variant. WSFP Device variants are defined as a WSFP Device adapted with SFP, SFP+, SFP28, SFP56, SFP112, SFP-DD, SFP-DD112, QSFP, QSFP+, QSPF28, QSFP56, QSFP-DD, QSFP-DD, QSFP-DD800, OSFP, OSFP800, or OSFP-XD technologies. These technologies are, but not limited to, the applicable MSA specifications on mechanical housings, printed circuit boards, electrical interface, power, environmental, regulatory, and management. WSFP Device variants are also defined with future SFF, MSA, and other standard bodies defining small pluggable form factor technologies. The WSFP Device 100*a*-100*p* variants are illustrated in FIGS. 27-35.

As illustrated in FIG. 25, the First Network 20 includes Communication Equipment 220 having a Port 222 and Port 224. The Second Network 30 includes a Communication Equipment 310 with four SFP Ports 312, 314, 316, and 318, tour wireless Internet of Thing (IoT) Devices 320, 322, 324, and 326, a wireless Cell Phone 330, and a wireless Computer Tablet 332. A cable 520*b* connects Communication Services from Port 222 of the Communication Equipment 220 of the First Network 20 to a generic SFP Device connected to the SFP Port 314 of the Communication Equipment 310 of the Second Network 30. Communication Equipment 310 connects the Communication Services from SFP Port 314 to SFP Ports 312, 316, or 318. The wireless SFP (WSFP) Device 100*a*-100*p* variant is installed in SFP Port 312 of Communication Equipment 310 of the Second Network 30. The SFP Port 312 is mechanically compatible and electrically interoperable to the installed WSFP Device 100*a*-100*p* variant. FIG. 36, hereinafter referred to as Table 1, provides a SFP Port compatibility reference for the WSFP Device 100*a*-100*p* variant. Table 1 does not guarantee SFP Port compatibility due to the variety of manufacturers of SFP ports with proprietary mechanical, electrical, and environmental specifications. The WSFP Device 100*a*-100*p* variant can function as a wireless Bridge, Repeater, Station, or Router. The WSFP Device 100*a*-100*p* variant connects Communication Services to wireless Cell Phone 330 and wireless Mobile Tablet 332 through wireless Signal 500. The WSFP Device 100*a*-100*p* variant also provides a second wireless Signal 700 to establish a Bluetooth Low Energy (BLE), Bluetooth Mesh Network, Version 1.0.1, Revision Date Dec. 2, 2020 or a Zigbee Mesh Network, IEEE Standard 802.15.4-2003, with wireless IoT Devices 320, 322, 324, and 326. A BLE or Zigbee Mesh Network allows IoT Devices 320, 322, 324, and 326 to communicate with each other. The second wireless Signal 700 also allows the WSFP Device 100*a*-100*p* variant to be provisioned, to provide status, or initiate tests of the wireless Signal 500, the WSFP Device 100*a*-100*p* variant, or the host Communication Equipment 310 of the Second Network 30.

Oval circle B is an expanded illustration of the wireless WSFP Device 100*a*-100*p* variant connected to Port 312 of the Communication Equipment 310, specifically interfacing and connecting the WSFP Device 100*a*-100*p* variant differential Signals 600 to SFP Port 312 of the Communication Equipment 310 of the Second Network 30.

Figure 26:
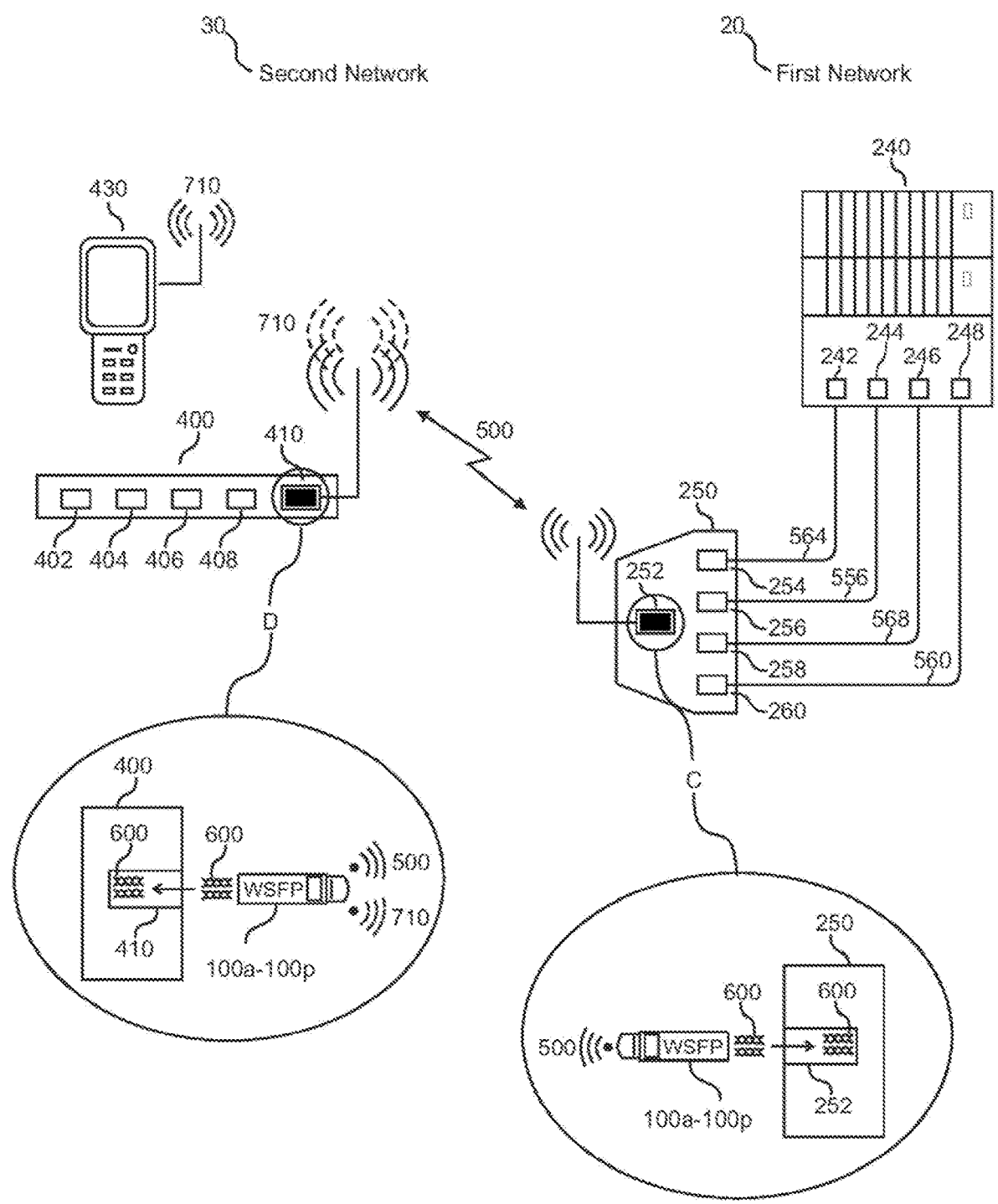
FIG. 26 is a schematic diagram of a telecommunication system illustrating the use of two wireless SFP Device variants for communication services and use of a secondary wireless technology for status, provisioning, testing, and communications.

FIG. 26 illustrates another exemplary embodiment of a method and system of the present disclosure for the wireless SFP (WSFP) Device of the present invention functioning as a wireless transport of communication services using different WSFP Device variants. The present invention can be deployed as a cost-effective, efficient, and simple method to use identical or different WSFP Devices as a wireless transport communication services between a First Network 20 and a Second Network 30. WSFP Device variants are defined as a WSFP Device with SFP, SFP+, SFP28, SFP56, SFP112, SFP-DD, SFP-DD112, QSFP, QSFP+, QSPF28, QSFP56, QSFP-DD, QSFP-DD, QSFP-DD800, OSFP, OSFP800, or OSFP-XD technologies. These technologies are, but not limited to, the applicable MSA specifications on mechanical housings, printed circuit boards, electrical interface, power, environmental, regulatory, and management. WSFP Device variants are also defined with future SFF, MSA, and other standard bodies defining small pluggable form factor technologies. The WSFP Device 100*a*-100*p* variants are illustrated in FIGS. 27-35.

As illustrated in FIG. 26, the First Network 20 includes Communication Equipment 240 having Ports 242, 244, 246, and 248 and another Communication Equipment 250 having an SFP port 252, and Ports 254, 256, 258, and 260. The Second Network 30 includes a Communication Equipment 400 with an SFP Port 410, and Ports 402, 404, 406, and 408, and a wireless Mobile Device 430. Four cables 564, 556, 568, and 560 connect Ports 242, 244, 246, and 248 of the Communication Equipment 240 to the Ports 254, 256, 258, and 260 of the Communication Equipment 250, respectively of the First Network 20. The wireless SFP (WSFP) Device 100*a*-100*p* variant is installed in SFP Port 252 of Communication Equipment 250 of the First Network 20. The SFP Port 252 is mechanically compatible and electrically interoperable to the installed WSFP Device 100*a*-100*p* variant. Table 1 provides a SFP Port compatibility reference for the WSFP Device 100*a*-100*p* variants. Table 1 does not guarantee SFP Port compatibility due to the variety of manufacturers of SFP ports with proprietary mechanical, electrical, and environmental specifications. The WSFP Device 100*a*-100*p* variant connects a wireless communication service 500 to another WSFP Device 100*a*-100*p* variant installed in SFP Port 410 of Communication Equipment 400 of the Second Network 30. As an example of WSFP Device variant interoperability, a WSFP Device 100*k* variant with QSFP+ technologies is installed in SFP Port 252 of Communication Equipment 250. The WSFP Device 100*k* installed in SFP Port 252 is connected to Ports 254, 256, 258, and 260 of Communication Equipment 250 and receives 40 Gb/s Ethernet communication service from Communication Equipment 240 by means of Cables 564, 556, 568, and 560. The WSFP Device 100*k* transports 40 Gb/s Ethernet communication services from Communication Equipment 240 to a WSFP Device 100*f* variant with SFP-DD technologies installed in SFP Port 410 of Communication Equipment 400 of the Second Network 30. The WSFP Device 100*f* with SFP-DD technologies connects the 40 Gb/s Ethernet communication services to Ports 402, 404, 406, and 408 of Communication Equipment 400.

Oval circle C is an expanded illustration of the wireless WSFP Device 100b-100p variant connected to Port 252 of the Communication Equipment 250, specifically interfacing and connecting the WSFP Device 100b-100p variant differential Signals 600 to SFP Port 252 of the Communication Equipment 250 of the First Network 30.

Oval circle D is an expanded illustration of the wireless WSFP Device 100b-100p variant connected to Port 410 of the Communication Equipment 400, specifically interfacing and connecting the WSFP Device 100b-100p variant differential Signals 600 to SFP Port 410 of the Communication Equipment 400 of the Second Network 30.

Mobile device 430 connects to a second wireless Signal 710 and allows the WSFP Device variants 100a-100p installed in SFP Port 410 of the Communication Equipment 400 of the Second Network 30 to communicate with each other. Mobile device 430 can be provisioned, retrieve wireless communication service status or initiate tests of the wireless Signal 500, the WSFP Device 100b-100p variant, or the host Communication Equipment 410 of the Second Network 30.

Figure 27A:
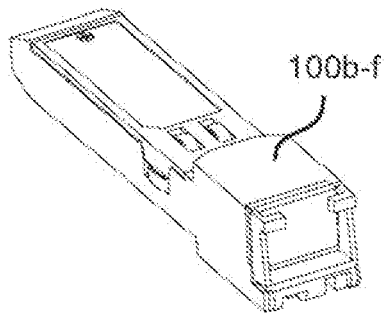
FIG. 27A is a perspective view of a generic SFP housing for the wireless SFP Device variants of the present disclosure.
Figure 27B:
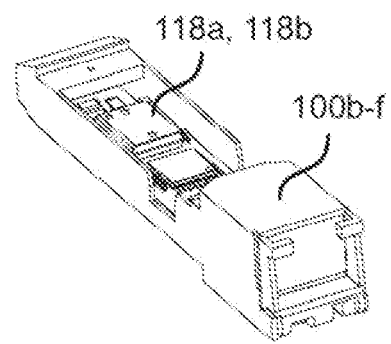
FIG. 27B is a top front perspective view of a generic SFP housing for wireless SFP Device variants of the present disclosure with the housing partially removed to illustrate internal components.
Figure 27C:
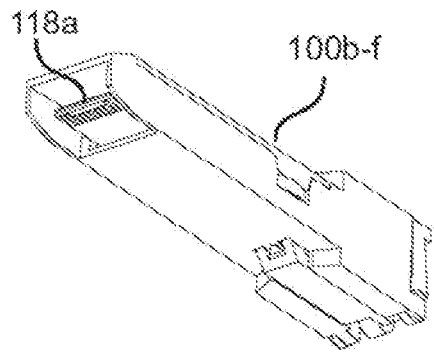
FIG. 27C is a bottom back perspective view of a generic SIP housing for wireless SFP Device variants of the present disclosure with a printed circuit board edge connector.
Figure 27D:
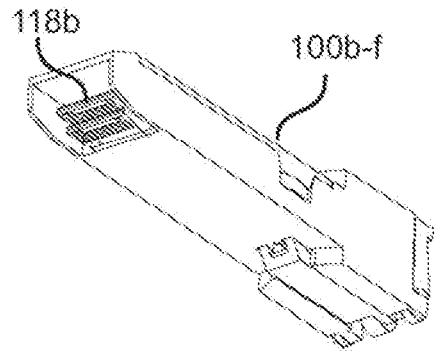
FIG. 27D is a bottom back perspective view of a generic SFP housing for wireless SFP Device variants of the present disclosure with two printed circuit board edge connectors.

FIGS. 27A-D illustrates a number of embodiments of the wireless SFP Device (WSFP) 100b-100f variants. WSFP Device 100b-100f variants are defined as the WSFP Device using SFP, SFP+, SFP28, SFP56, SFP112, SFP-DD, or SFP-DD112 technologies. These technologies are, but not limited to, the applicable MSA specifications on mechanical housings, printed circuit boards, electrical interface, power, environmental, regulatory, and management. Table 1 provides details on the SFP Device variant speeds. The SFP Device variant speed may correlate to the WSFP Device 100b-100f variant wireless speed. A WSFP Device 100b-100f variant with SFP-DD technologies may provide wireless speed up to 100 Gb/s. FIG. 27A is a perspective view of a generic SFP housing for the wireless SFP Device 100b-100f variants. FIG. 27B is a top front perspective view of a generic SFP housing for wireless SFP Device 100b-100f variants with the housing partially removed to illustrate internal components on a printed circuit board (PCB) Assembly 118a and 118b. PCB Assembly 118a is a printed circuit board with internal components and an edge connector. WSFP Device 100b-100f variants with SFP, SFP+, SFP28, SFP56, or SFP112 technologies use PCB Assembly 118a. PCB Assembly 118b is a printed circuit board with internal components and two PCB edge connectors. PCB Assembly 118b comprises of at least two printed circuit boards to provide the two PCB edge connectors. WSFP Device 100b-100f variants with SFP-DD (Double Density) or SFP-DD112 technologies use PCB Assembly 118b. FIG. 27C is a bottom back perspective view of a generic SFP housing for wireless SFP Device 100b-100f variants with the printed circuit board (PCB) edge connector of PCB Assembly 118a. FIG. 27D is a bottom back perspective view of a generic SFP housing for wireless SFP Device 100b-100f variants with two printed circuit board (PCB) edge connectors of PCB Assembly 118b.

Figure 28A:
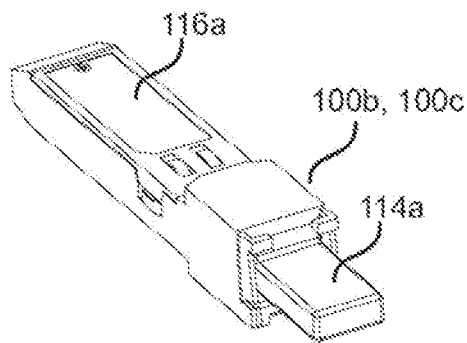
FIG. 28A is a perspective view of the wireless SFP Device variants of the present disclosure with an integrated antenna.
Figure 28B:
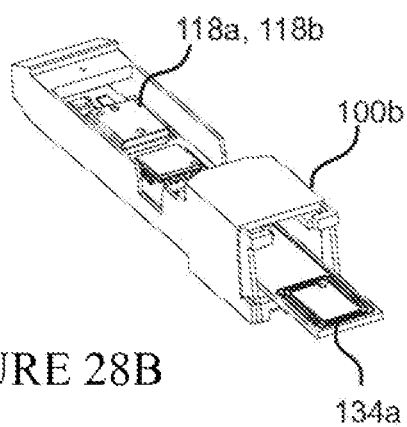
FIG. 28B is a top front perspective view of the wireless SFP Device variants of the present disclosure with the housing partially removed to illustrate internal components with an internal PCB antenna.
Figure 28C:
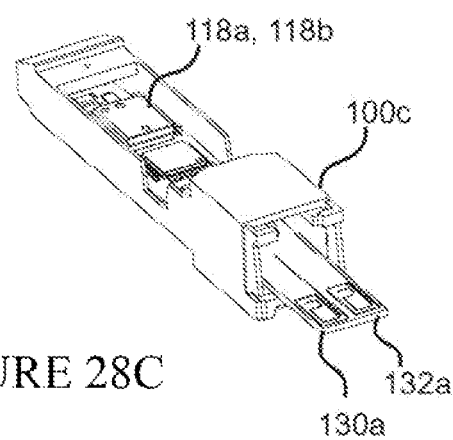
FIG. 28C is a top front perspective view of the wireless SFP Device variants of the present disclosure with the housing partially removed to illustrate internal PCB antenna for MIMO applications.

FIGS. 28A-C illustrates a number of embodiments of the wireless SFP Device (WSFP) 100b and 100c variants with an integrated antenna(s). WSFP Device 100b and 100c variants are defined as the WSFP Device using SFP, SFP+, SFP28, SFP56, SFP112, SFP-DD, or SFP-DD112 technologies. FIG. 28A is a perspective view of the WSFP Device 100b and 100c variant with a top housing 116a and antenna cover 114a. FIG. 28B is a top front perspective view of the WSFP Device 100b variant with the housing partially removed to illustrate internal components on PCB Assembly 118a or 118b, and an integrated antenna 134a. The integrated antenna 134a can be an antenna etched on a printed circuit board, a chip antenna, or a combination of both. A ceramic chip antenna is a very small and compact component placed on a PCB board to radiate and receive electromagnetic waves just like a standard antenna. FIG. 28C is a top front perspective view of the WSFP Device 100c variant with the housing partially removed to illustrate internal components on PCB Assembly 118a or 118b, and integrated antennas 130a and 132a for MIMO applications. The integrated antennas 130a and 132a can be an antenna etched on a printed circuit board, a chip antenna, or a combination of both. WSFP Device 100b and 100c variant with PCB Assembly 118a use SFP, SFP+, SFP28, SFP56, or SFP112 technologies. WSFP Device 100b and 100c variant with PCB Assembly 118b use SFP-DD or SFP-DD112 technologies.

Figure 29A:
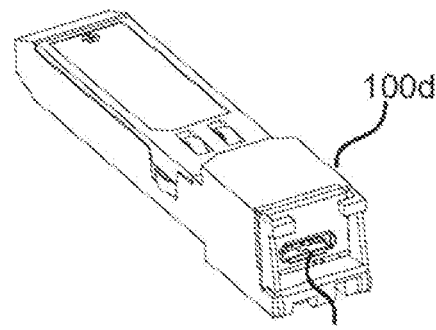
FIG. 29A is a front perspective view of a wireless SFP Device variant of the present disclosure with a USB connector.
Figure 29B:
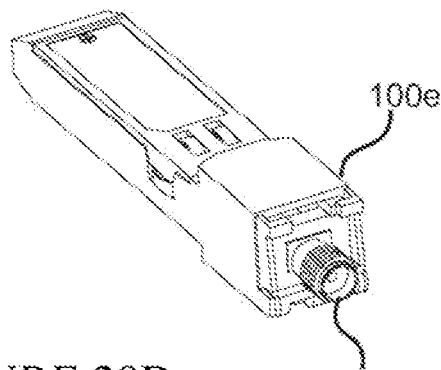
FIG. 29B is a front perspective view of a wireless SFP Device variant of the present disclosure with a coaxial connector.
Figure 29C:
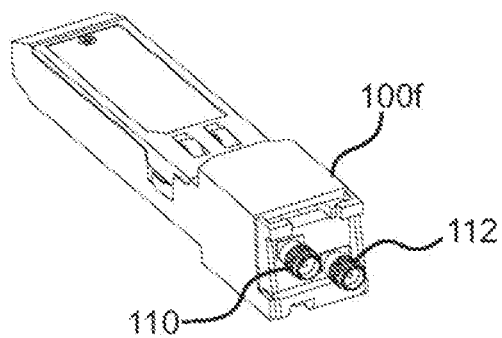
FIG. 29C is a front perspective view of a wireless SFP Device variant of the present disclosure with two coaxial connectors.

FIGS. 29A-C illustrates a number of embodiments of the wireless SFP Device (WSFP) 100d-100f variants with an external antenna(s) connector. FIG. 29A is a perspective view of the WSFP Device 100d variant with a USB connector 134 to attach an external antenna. FIG. 29B is a top front perspective view of the WSFP Device 100e variant and a SMA coaxial Connector 136 to attach an external antenna. FIG. 29C is a top front perspective view of the WSFP Device 100f variant and SMA coaxial Connectors 110 and 112 to attach external antennas for MIMO applications. WSFP Device 100d-100f variant with PCB Assembly 118a use SFP, SFP+, SFP28, SFP56, or SFP112 technologies. WSFP Device 100d-100f variant with PCB Assembly 118b use SFP-DD or SFP-DD112 technologies.

Figure 30A:
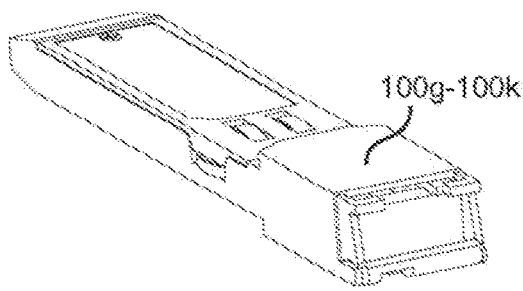
FIG. 30A is a perspective view of a generic QSFP housing for the wireless SFP Device variants with QSFP technologies of the present disclosure.
Figure 30B:
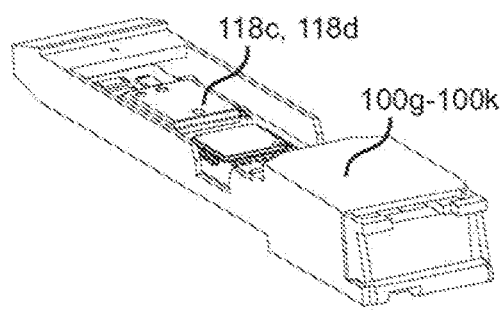
FIG. 30B is a top front perspective view of a generic QSFP housing for wireless SFP Device variants with QSFP technologies of the present disclosure with the housing partially removed to illustrate internal components.
Figure 30C:
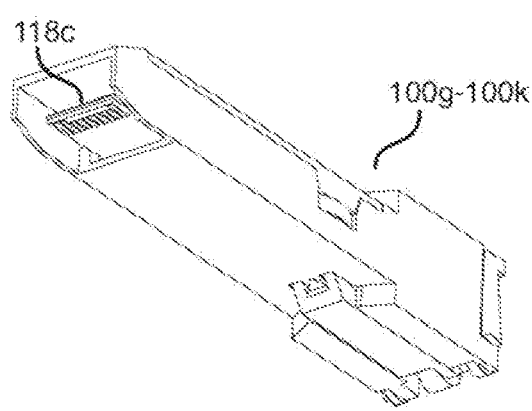
FIG. 30C is a bottom back perspective view of a generic QSFP housing for wireless SFP Device variants with QSFP technologies of the present disclosure with a printed circuit board edge connector.
Figure 30D:
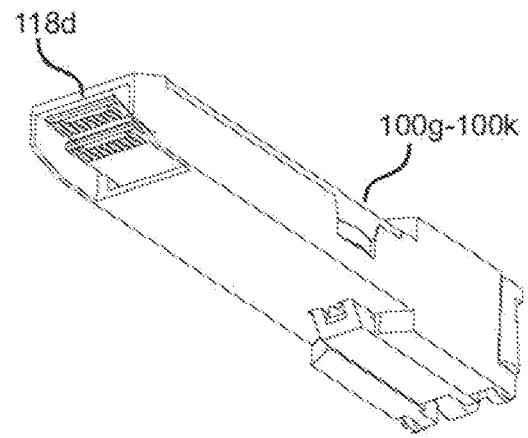
FIG. 30D is a bottom back perspective view of a generic QSFP housing for wireless SFP Device variants with QSFP technologies of the present disclosure with two printed circuit board edge connectors.

FIGS. 30A-D illustrates a number of embodiments of the wireless SFP Device (WSFP) 100g-100k variants. WSFP Device 100g-100k variants are defined as a WSFP Device using QSFP, QSFP+, QSPF28, QSFP56, QSFP-DD, QSFP-DD, or QSFP-DD800 technologies. These technologies are, but not limited to, the applicable MSA specifications on mechanical housings, printed circuit boards, electrical interface, power, environmental, regulatory, and management. Table 1 provides details on the SFP Device variant speeds. The SFP Device variant speed may correlate to the WSFP Device variant wireless speed. A WSFP Device 100g-100k variant designed to QSFP+ MSA standards or requirements may provide wireless speed up to 40 Gb/s. FIG. 30A is a perspective view of a generic SFP housing for the wireless SFP Device variants 100g-100k. FIG. 30B is a top front perspective view of a generic SFP housing for wireless SFP Device 100g-100k variants with the housing partially removed to illustrate internal components on a printed circuit board (PCB) Assembly 118c and 118d. PCB Assembly 118c is a printed circuit board with internal components and an edge connector adapted for QSFP, QSFP+, QSPF28, or QSFP56 technologies. WSFP Device 100g-100k variants with QSFP, QSFP+, QSPF28, or QSFP56 technologies uses PCB Assembly 118c. PCB Assembly 118d is a printed circuit board with internal components and two PCB edge connectors adapted for QSFP-DD or QSFP-DD800 technologies. PCB Assembly 118d comprises of at least two printed circuit boards to provide the two PCB edge connectors. WSFP Device 100g-100k variants with QSFP-DD (Double Density) or QSFP-DD800 technologies uses PCB Assembly 118d. FIG. 30C is a bottom back perspective view of a generic SFP housing for wireless SFP Device variants adapted for QSFP, QSFP+, QSPF28, or QSFP56 technologies with the printed circuit board (PCB) edge connector of PCB Assembly 118c. FIG. 30D is a bottom back perspective view of a generic SFP housing for wireless SFP Device variants adapted for QSFP-DD or QSFP-DD800 technologies with two printed circuit board (PCB) edge connectors of PCB Assembly 118d.

Figure 31A:
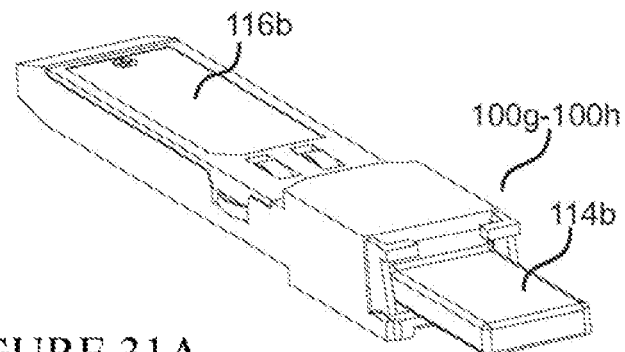
FIG. 31A is a perspective view of a wireless SFP Device variant with QSFP technologies of the present disclosure with integrated antenna.
Figure 31B:
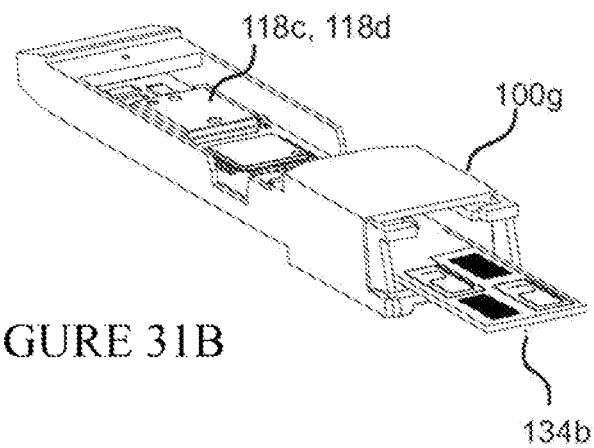
FIG. 31B is a top front perspective view of a wireless SFP Device with QSFP technologies of the present disclosure with the housing partially removed to illustrate internal components and a PCB antenna.
Figure 31C:
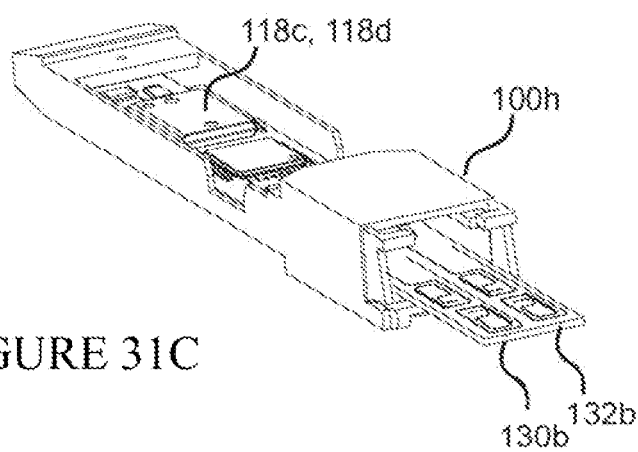
FIG. 31C is a top front perspective view of the wireless SFP Device variants with QSFP technologies of the present disclosure with the housing partially removed to illustrate internal PCB antenna for MIMO applications.

FIGS. 31A-C illustrates a number of embodiments of the wireless SFP Device (WSFP) 100g and 100h variants with an integrated antenna(s). WSFP Device 100g-100h variants are defined as the WSFP Device with of PCB Assembly 118c using QSFP, QSFP+, QSFP28, or QSFP56 technologies. FIG. 31A is a perspective view of the WSFP Device 100g and 100h variant with a top housing 116b and antenna cover 114b. FIG. 31B is a top front perspective view of the WSFP Device 100g variant with the housing partially removed to illustrate internal components on PCB Assembly 118c or 118d, and an integrated antenna 134b. The integrated antenna 134b can be an antenna etched on a printed circuit board, a chip antenna, or a combination of both. FIG. 31C is a top front perspective view of the WSFP Device 100h variant with the housing partially removed to illustrate internal components on PCB Assembly 118c or 118d, and integrated antennas 130b and 132b for MIMO applications. The integrated antennas 130b and 132b can be an antenna etched on a printed circuit board, a chip antenna, or a combination of both. WSFP Device 100g and 100h variant with PCB Assembly 118c use QSFP, QSFP+, QSFP28, or QSFP56 technologies. WSFP Device 100g and 100h variant with PCB Assembly 118d use QSFP-DD or QSFP-DD800 technologies.

Figure 32A:
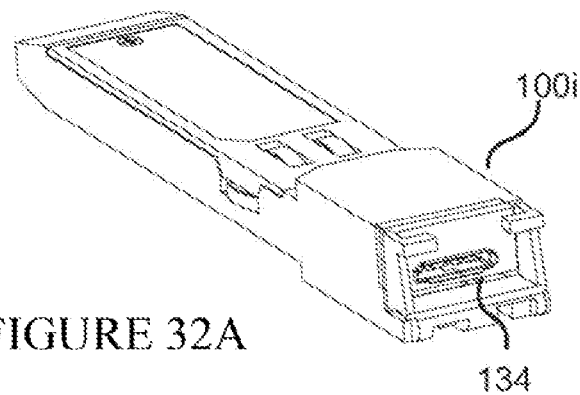
FIG. 32A is a front perspective view of a wireless SFP Device variant with QSFP technologies of the present disclosure with a USB connector.
Figure 32B:
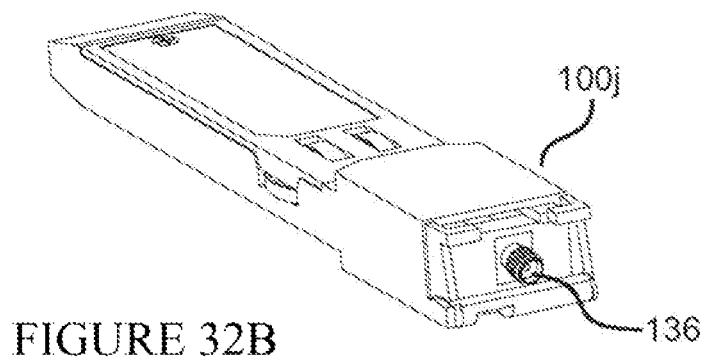
FIG. 32B is a front perspective view of a wireless SFP Device variant with QSFP technologies of the present disclosure with a coaxial connector.
Figure 32C:
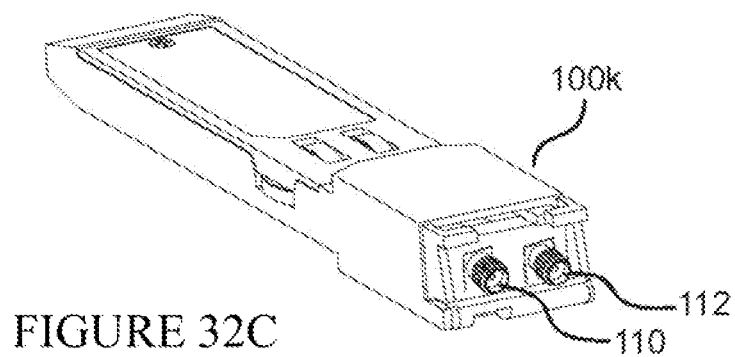
FIG. 32C is a front perspective view of a wireless SFP Device variant with QSFP technologies of the present disclosure with two coaxial connectors.

FIGS. 32A-C illustrates a number of embodiments of the wireless SFP Device (WSFP) 100i-100k variants with an external antenna(s) connector. WSFP Device 100i-100k variants are defined as the WSFP Device using QSFP, QSFP+, QSFP28, QSFP56, QSFP-DD, or QSFP-DD800 technologies. FIG. 32A is a perspective view of the WSFP Device 100i variant with a USB connector 134 to attach an external antenna. FIG. 32 B is a top front perspective view of the WSFP Device 100j variant with a SMA coaxial Connector 136 to attach an external antenna. FIG. 32C is a top front perspective view of the WSFP Device 100k with SMA coaxial Connectors 110 and 112 to attach external antennas for MIMO applications. WSFP Device 100i and 100k variant with PCB Assembly 118c use QSFP, QSFP+, QSFP28, or QSFP56 technologies. WSFP Device 100i-100k variant with PCB Assembly 118d use QSFP-DD or QSFP-DD800 technologies.

Figure 33A:
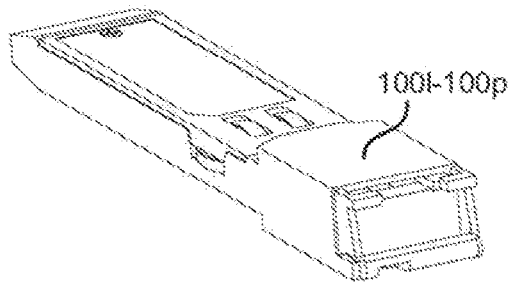
FIG. 33A is a perspective view of a generic OSFP housing for the wireless SFP Device variants with OSFP technologies of the present disclosure.
Figure 33B:
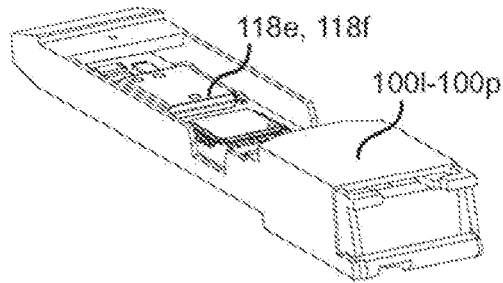
FIG. 33B is a top front perspective view of a generic OSFP housing for wireless SFP Device variants with OSFP technologies of the present disclosure with the housing partially removed to illustrate internal components.
Figure 33C:
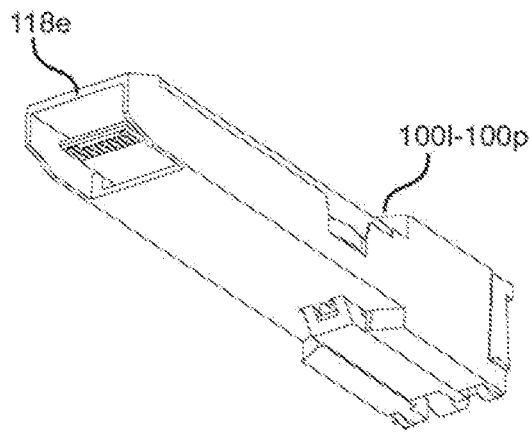
FIG. 33C is a bottom back perspective view of a generic OSFP housing for wireless SFP Device variants with OSFP technologies of the present disclosure with a printed circuit board edge connector.
Figure 33D:
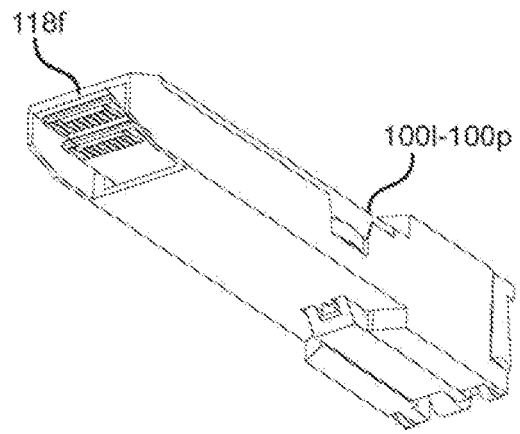
FIG. 33D is a bottom back perspective view of a generic OSFP housing for wireless SFP Device variants with OSFP technologies of the present disclosure with two printed circuit board edge connectors.

FIGS. 33A-D illustrates a number of embodiments of the wireless SFP Device (WSFP) 100l-100p variants. WSFP Device 100l-100p variants are defined as a WSFP Device using OSFP, OSFP-800, or OSFP-XD technologies. These technologies are, but not limited to, the applicable MSA specifications on mechanical housings, printed circuit boards, electrical interface, power, environmental, regulatory, management, and others requirements. Table 1 provides details on the SFP Device variant speeds. The SFP Device variant speed may correlate to the WSFP Device variant wireless speed. A WSFP Device 100l-100p variant designed to OSFP MSA standards or requirements may provide wireless speed up to 400 Gb/s. FIG. 33A is a perspective view of a generic SFP housing for the wireless SFP Device variants 100l-100p. FIG. 33B is a top front perspective view of a generic SFP housing for wireless SFP Device 100l-100p variants with the housing partially removed to illustrate internal components on a printed circuit board (PCB) Assembly 118e and 118f PCB Assembly 118e is a printed circuit board with internal components and an edge connector adapted for OSFP and OSFP-800 technologies. WSFP Device 100l-100p variants with OSFP or OSFP-800 technologies uses PCB Assembly 118e. PCB Assembly 118f is a printed circuit board with internal components and two PCB edge connectors adapted for OSFP-XD technologies. PCB Assembly 118f comprises of at least two printed circuit boards to provide the two PCB edge connectors. WSFP Device 100l-100p variants with OSFP-XD technologies uses PCB Assembly 118f. FIG. 33C is a bottom back perspective view of a generic SFP housing for wireless SFP Device variants adapted for OSFP and OSFP-800 technologies with the printed circuit board (PCB) edge connector of PCB Assembly 118e. FIG. 33D is a bottom back perspective view of a generic SFP housing for wireless SFP Device variants adapted for OSFP-XD technologies with two printed circuit board (PCB) edge connectors of PCB Assembly 118f.

Figure 34A:
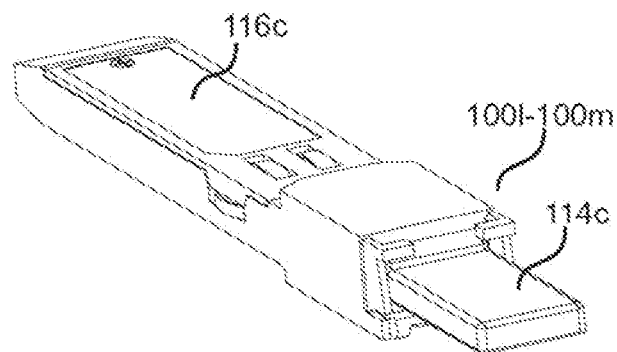
FIG. 34A is a perspective view of a wireless SFP Device variant with OSFP technologies of the present disclosure with integrated antenna.
Figure 34B:
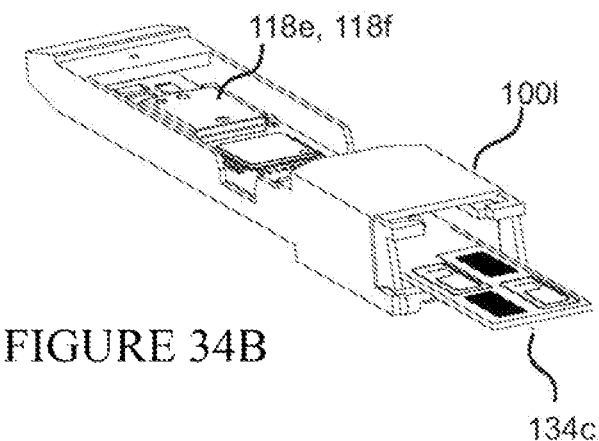
FIG. 34B is a top front perspective view of a wireless SFP Device with OSFP technologies of the present disclosure with the housing partially removed to illustrate internal components and a PCB antenna.
Figure 34C:
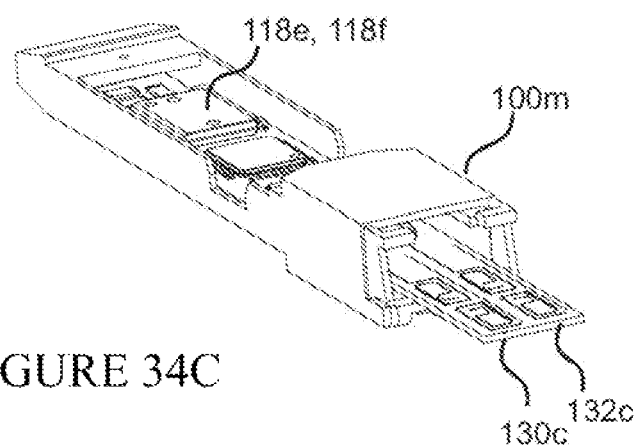
FIG. 34C is a top front perspective view of the wireless SFP Device variants with OSFP technologies of the present disclosure with the housing partially removed to illustrate internal PCB antenna for MIMO applications.

FIGS. 34A-C illustrates a number of embodiments of the wireless SFP Device (WSFP) 100l and 100m variants with an integrated antenna(s). WSFP Device 100l and 100m variants are defined as the WSFP Device with PCB Assembly 118e using OSFP and OSFP-800 technologies. FIG. 34A is a perspective view of the WSFP Device 100l and 100m variant with a top housing 116c and antenna cover 114c. FIG. 34B is a top front perspective view of the WSFP Device 100l variant with the housing partially removed to illustrate internal components on PCB Assembly 118e or 118f, and an integrated antenna 134c. The integrated antenna 134c can be an antenna etched on a printed circuit board, a chip antenna, or a combination of both. A ceramic chip antenna is a very small and compact component placed on a PCB board to radiate and receive electromagnetic waves just like a standard antenna. FIG. 34C is a top front perspective view of the WSFP Device 100m variant with the housing partially removed to illustrate internal components on PCB Assembly 118e or 118f, and integrated antennas 130c and 132c for MIMO applications. The integrated antennas 130c and 132c can be an antenna etched on a printed circuit board, a chip antenna, or a combination of both. A ceramic chip antenna is a very small and compact component placed on a PCB board to radiate and receive electromagnetic waves just like a standard antenna. WSFP Device 100l and 100m variant with PCB Assembly 118e use OSFP or OSFP-800 technologies. WSFP Device 100l and 100m variant with PCB Assembly 118f use OSFP-XD technologies.

Figure 35A:
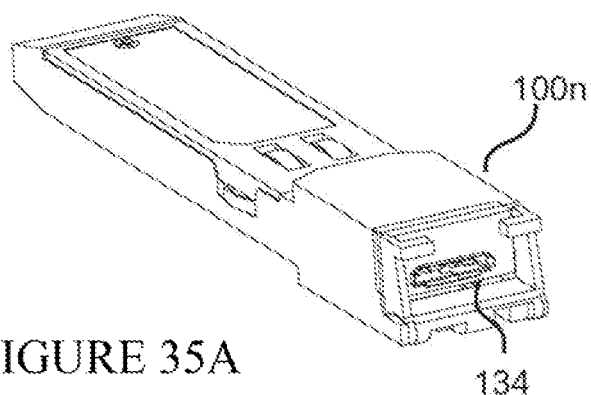
FIG. 35A is a front perspective view of a wireless SFP Device variant with OSFP technologies of the present disclosure with a USB connector.
Figure 35B:
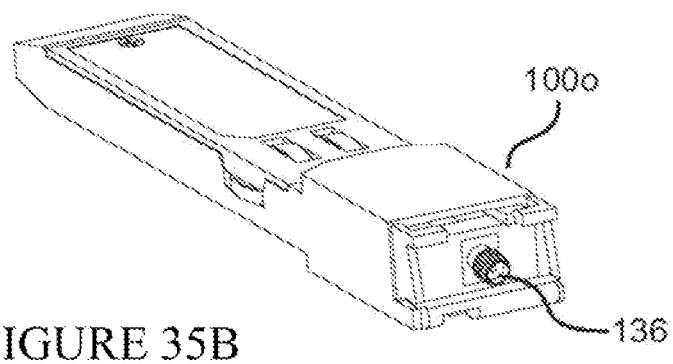
FIG. 35B is a front perspective view of a wireless SFP Device variant with OSFP technologies of the present disclosure with a coaxial connector.
Figure 35C:
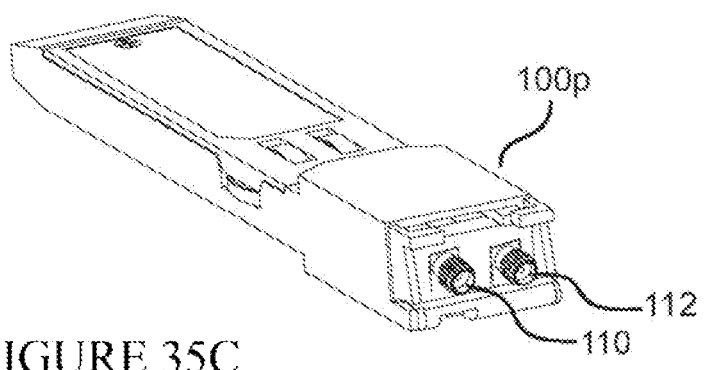
FIG. 35C is a front perspective view of a wireless SFP Device variant with OSFP technologies of the present disclosure with two coaxial connectors.

FIGS. 35A-C illustrates a number of embodiments of the wireless SFP Device (WSFP) 100n-100p variants with an external antenna(s) connector. WSFP Device 100n-100p variants are defined as the WSFP Device using OSFP, OSFP-800, or OSFP-XD technologies. FIG. 35A is a perspective view of the WSFP Device 100n variant with a USB connector 134 to attach an external antenna. FIG. 35B is a top front perspective view of the WSFP Device 100o variant with a SMA coaxial Connector 136 to attach an external antenna. FIG. 35 is a top front perspective view of the WSFP Device 100p with SMA coaxial Connectors 110 and 112 to attach external antennas for MIMO applications. WSFP Device 100n-100p variant with PCB Assembly 118e use OSFP or OSFP-800 technologies. WSFP Device 100n-100p variant with PCB Assembly 118f use OSFP-XD technologies.

While the embodiment(s) disclosed herein are illustrative of the structure, function and operation of the exemplary method(s), system(s) and device(s), it should be understood that various modifications may be made thereto with departing from the teachings herein. Further, the components of the method(s), system(s) and device(s) disclosed herein can take any suitable form, including any suitable hardware, circuitry or other components capable of adequately performing their respective intended functions, as may be known in the art.

It should be understood that the individual components of the circuitry illustrated in FIGS. 10-13, 15, 24A and 24B could be any commercially available components, respectively. For example, the wireless SoC could be a Broadcom/Cypress BCM4339, a Marvell Avastar 88W8887, a Marvell Avastar 88W8977, or any equivalent or similar SoC suitable to produce the device(s), system(s) and method(s) disclosed herein, and/or achieve the functionality of the device(s), system(s) and method(s) disclosed herein. The FPGA when used could be either a Microsemi SmartFusion2 SoC FPGA, an Intel/Altera Cyclone V FPGA, or any equivalent or similar FPGA suitable to produce the device(s), system(s) and method(s) disclosed herein, and/or achieve the functionality of the device(s), system(s) and method(s) disclosed herein.

While the foregoing discussion presents the teachings in an exemplary fashion with respect to the disclosed method(s), system(s) and device(s) for providing wireless communication services, it will be apparent to those skilled in the art that the present disclosure may apply to other method(s) and system(s) utilizing wireless technologies. Further, while the foregoing has described what are considered to be the best mode and/or other examples, it is understood that various modifications may be made therein and that the subject matter disclosed herein may be implemented in various forms and examples, and that the method(s), system(s) and device(s) may be applied in numerous applications, only some of which have been described herein.

What is claimed is:

1. A wireless small form-factor pluggable (WSFP) variant device comprising:
    a printed circuit board having circuitry; and
    wherein the circuitry includes at least two antenna for transmission and reception of at least two wireless signals via at least two wireless communication channels; and
    wherein the WSFP variant device is configured to plug into a network interface device and is further configured to communicate with first network equipment via one of the at least two communication channels and to communicate with second network equipment via another of the at least two communication channels.

2. The device of claim 1, wherein the at least two antenna comprise at least two antenna selected from the group of a first internal etched antenna, a second internal etched antenna, a first ceramic chip antenna and a second ceramic chip antenna.

3. The device of claim 1, further comprising at least one Coax or USB antenna connector.

4. The device of claim 3, wherein the at least two antenna comprise at least two antenna selected from the group of a first internal etched antenna, a second internal etched antenna, a first ceramic chip antenna, a second ceramic chip antenna, a first Coax antenna, a second Coax antenna, a first USB antenna and a second USB antenna.

5. The device of claim 1, wherein the circuitry includes a wireless system on chip (SoC).

6. The device of claim 5, wherein the wireless system on chip (SoC) comprises a processor, a first wireless sub-system, a second wireless sub-system, a host interface, and peripheral modules.

7. The device of claim 6, wherein the wireless SoC integrates a microprocessor unit (MPU), a memory, a power manager, and an ASIC or FPGA.

8. The device of claim 1, wherein the circuitry includes power supply circuitry.

9. The device of claim 1, wherein the circuitry includes at least one of provisioning circuitry, monitoring circuitry and testing circuitry.

10. The device of claim 1, wherein the circuitry includes a microprocessor, a memory, and clock and timing circuitry.

11. The device of claim 1, wherein the circuitry includes an Application Specific Integrated Circuit (ASIC) or Field Programmable Gate Array (FPGA).

12. The device of claim 11, wherein the ASIC or FPGA integrates a microprocessor unit (MPU), a Wireless SOC, a Memory, and a Power Manager.

13. A wireless telecommunication system comprising:
    a network interface device having at least one SFP port;
    at least one wireless small form-factor pluggable (WSFP) variant device connected in the at least one SFP port, wherein the at least one WSFP variant device includes wireless circuitry and two associated antenna for transmission and reception of at least two wireless signals via at least two wireless communication channels;
    first communication equipment in wireless communication with the at least one WSFP variant device via one of the at least two wireless communication channels; and
    second communication equipment in wireless communication with the at least one WSFP variant device via another of the at least two wireless communication channels.

14. The system of claim 13, wherein the at least one WSFP variant device includes circuitry for configuring, monitoring, provisioning, or testing the second communication equipment.

15. The system of claim 13, wherein the at least one WSFP variant device is configured to provide a wireless signal demarcation between communication networks and/or communication services.

16. The system of claim 13, wherein the at least one WSFP variant device is configured to provide a wireless bridge/repeater for communication networks and/or communication services.

17. The system of claim 13, wherein the at least one WSFP variant device is configured to provide a wireless access point or station for communication networks and/or communication services.

18. A method for wireless telecommunication, comprising the steps of:
    providing wireless circuitry on a wireless small form-factor pluggable (WSFP) variant device, wherein the WSFP variant device includes
    at least two antenna for the wireless circuitry for transmission and reception of at least two wireless signals via at least a first wireless communication channel and a second wireless communication channel;
    plugging the small form-factor pluggable device into a network interface device; and
    communicating with first network equipment via the first wireless communication channel, and communicating with second network equipment via the second communication channel.

19. The method of claim 18, further comprising the step of configuring, monitoring, provisioning, and testing the second network equipment via the WSFP variant device.

20. The method of claim 18, further comprising the step of providing a wireless signal demarcation between the first network equipment and the second network equipment via the WSFP device.

21. The method of claim 18, further comprising the step of providing a wireless bridge/repeater for communication networks and/or communication services via the WSFP variant device.

22. The method of claim 18, further comprising the step of providing a wireless access point or station for communication networks and/or communication services via the WSFP variant device.

* * * * *